(12) United States Patent
Favor et al.

(10) Patent No.: US 11,416,406 B1
(45) Date of Patent: Aug. 16, 2022

(54) STORE-TO-LOAD FORWARDING USING PHYSICAL ADDRESS PROXIES STORED IN STORE QUEUE ENTRIES

(71) Applicant: Ventana Micro Systems Inc., Cupertino, CA (US)

(72) Inventors: John G. Favor, San Francisco, CA (US); Srivatsan Srinivasan, Cedar Park, TX (US)

(73) Assignee: Ventana Micro Systems Inc., Cupertino, CA (US)

( * ) Notice: Subject to any disclaimer, the term of this patent is extended or adjusted under 35 U.S.C. 154(b) by 0 days.

(21) Appl. No.: 17/351,927

(22) Filed: Jun. 18, 2021

Related U.S. Application Data

(63) Continuation-in-part of application No. 17/315,262, filed on May 7, 2021.

(51) Int. Cl.
| | |
|---|---|
| *G06F 12/08* | (2016.01) |
| *G06F 12/0864* | (2016.01) |
| *G06F 12/0811* | (2016.01) |
| *G06F 12/02* | (2006.01) |
| *G06F 12/0895* | (2016.01) |
| *G06F 12/0831* | (2016.01) |

(52) U.S. Cl.
CPC ...... *G06F 12/0864* (2013.01); *G06F 12/0238* (2013.01); *G06F 12/0811* (2013.01); *G06F 12/0833* (2013.01); *G06F 12/0895* (2013.01)

(58) Field of Classification Search
CPC .................................................. G06F 12/0864
See application file for complete search history.

(56) References Cited

U.S. PATENT DOCUMENTS

| | | |
|---|---|---|
| 5,526,510 A | 6/1996 | Akkary et al. |
| 6,662,280 B1 | 12/2003 | Hughes |
| 8,984,254 B2 | 3/2015 | Tran et al. |
| 2009/0172360 A1* | 7/2009 | Hikichi ................. G06F 9/3824 |
| | | 712/216 |
| 2015/0019840 A1 | 1/2015 | Anderson et al. |
| 2017/0293567 A1 | 10/2017 | Bryant et al. |

* cited by examiner

*Primary Examiner* — Jae U Yu
(74) *Attorney, Agent, or Firm* — E. Alan Davis; James W. Huffman; Huffman Law Group, PC

(57) ABSTRACT

A microprocessor includes a store queue (SQ) and a physically-indexed physically-tagged second-level set-associative cache. Each cache entry is uniquely identified by a set index and a way number. Each SQ entry holds information for a store instruction. The information includes store data to be written to a store physical address, a portion of which is a store physical line address. The information also includes a store physical address proxy (PAP) for the store physical line address. The store PAP specifies the set index and the way number of the cache entry into which a cache line specified by the store physical line address is allocated. A load unit, during execution of a load instruction, uses the store PAP held in a SQ entry in making a decision whether to forward to the load instruction the store data held in the SQ entry.

31 Claims, 14 Drawing Sheets

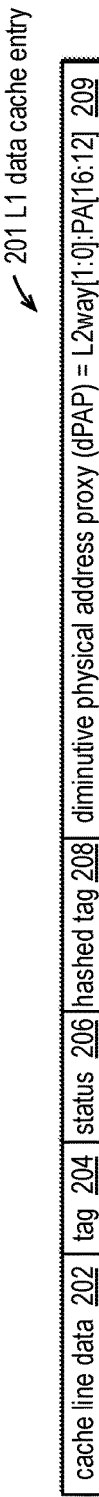
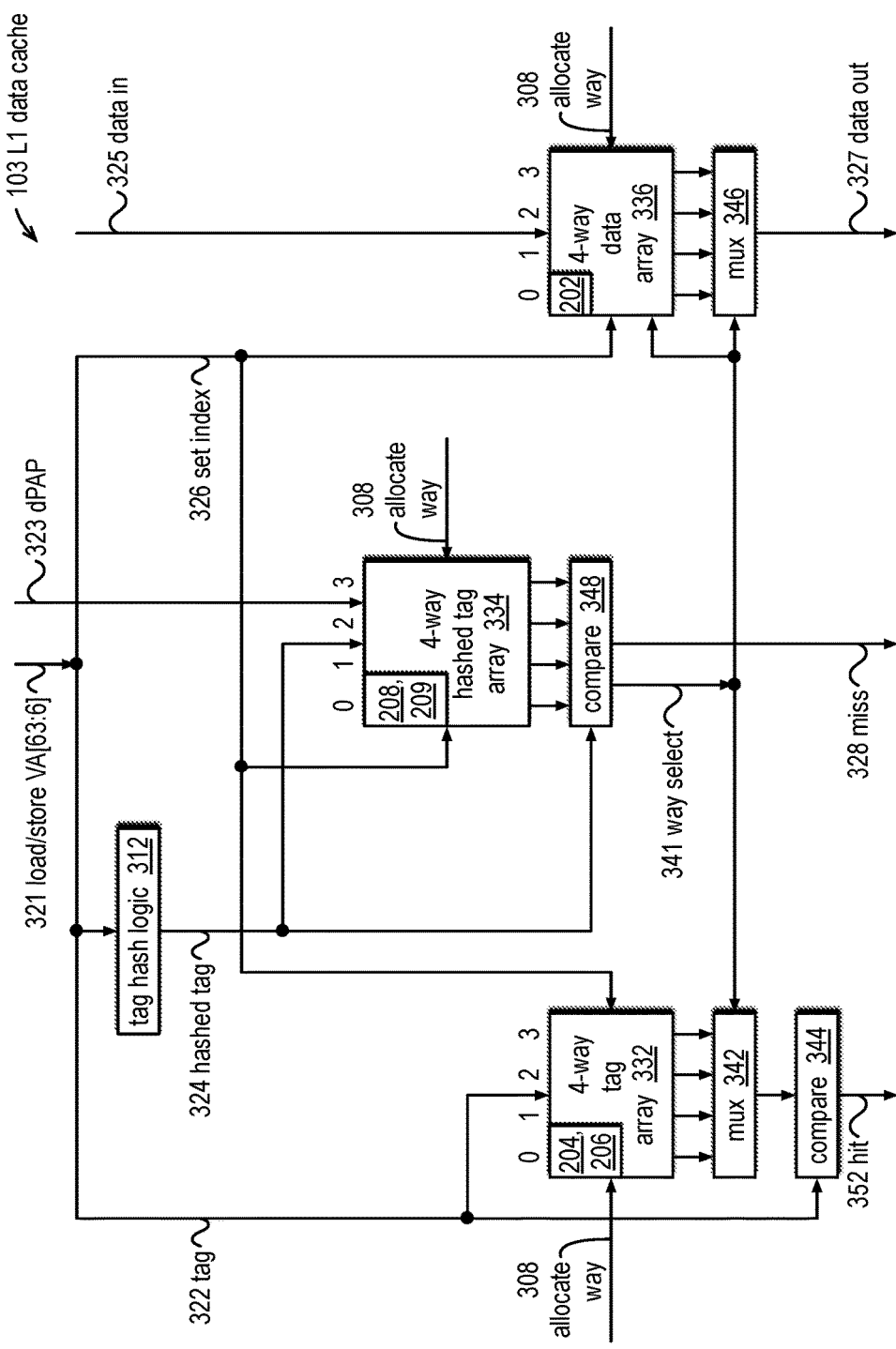
*FIG. 2*
*FIG. 3*

*FIG. 7*

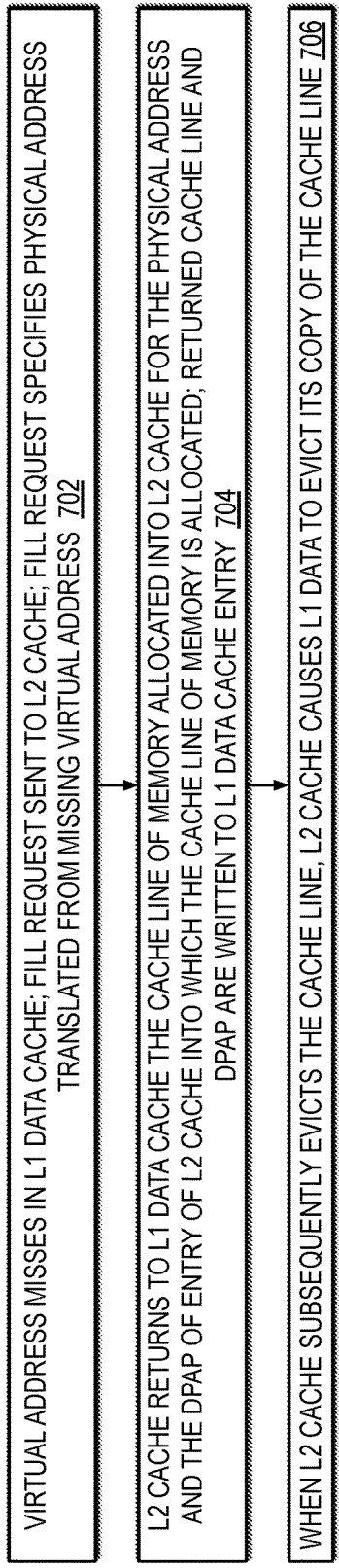

VIRTUAL ADDRESS MISSES IN L1 DATA CACHE; FILL REQUEST SENT TO L2 CACHE; FILL REQUEST SPECIFIES PHYSICAL ADDRESS TRANSLATED FROM MISSING VIRTUAL ADDRESS  702

L2 CACHE RETURNS TO L1 DATA CACHE THE CACHE LINE OF MEMORY ALLOCATED INTO L2 CACHE FOR THE PHYSICAL ADDRESS AND THE DPAP OF ENTRY OF L2 CACHE INTO WHICH THE CACHE LINE OF MEMORY IS ALLOCATED; RETURNED CACHE LINE AND DPAP ARE WRITTEN TO L1 DATA CACHE ENTRY  704

WHEN L2 CACHE SUBSEQUENTLY EVICTS THE CACHE LINE, L2 CACHE CAUSES L1 DATA TO EVICT ITS COPY OF THE CACHE LINE  706

*FIG. 8*

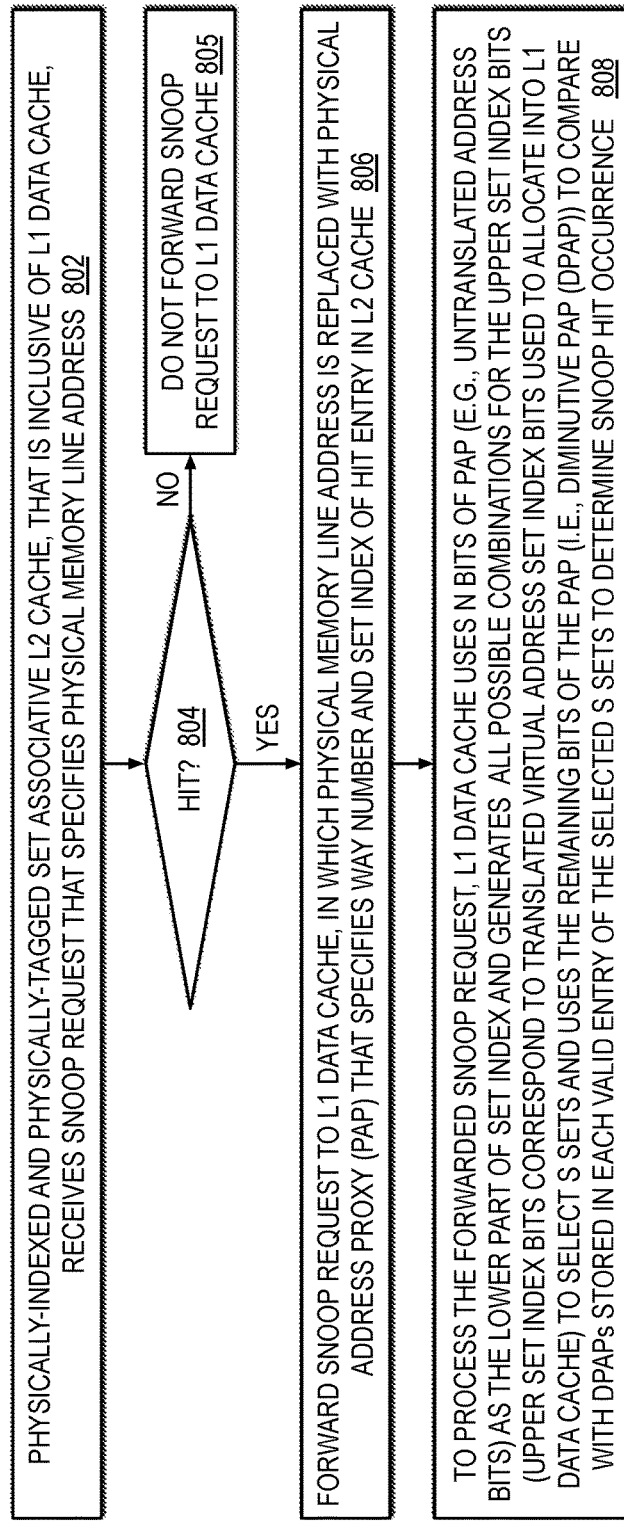

PHYSICALLY-INDEXED AND PHYSICALLY-TAGGED SET ASSOCIATIVE L2 CACHE, THAT IS INCLUSIVE OF L1 DATA CACHE, RECEIVES SNOOP REQUEST THAT SPECIFIES PHYSICAL MEMORY LINE ADDRESS  802

HIT?  804

NO → DO NOT FORWARD SNOOP REQUEST TO L1 DATA CACHE  805

YES

FORWARD SNOOP REQUEST TO L1 DATA CACHE, IN WHICH PHYSICAL MEMORY LINE ADDRESS IS REPLACED WITH PHYSICAL ADDRESS PROXY (PAP) THAT SPECIFIES WAY NUMBER AND SET INDEX OF HIT ENTRY IN L2 CACHE  806

TO PROCESS THE FORWARDED SNOOP REQUEST, L1 DATA CACHE USES N BITS OF PAP (E.G., UNTRANSLATED ADDRESS BITS) AS THE LOWER PART OF SET INDEX AND GENERATES ALL POSSIBLE COMBINATIONS FOR THE UPPER SET INDEX BITS (UPPER SET INDEX BITS CORRESPOND TO TRANSLATED VIRTUAL ADDRESS SET INDEX BITS USED TO ALLOCATE INTO L1 DATA CACHE) TO SELECT S SETS AND USES THE REMAINING BITS OF THE PAP (I.E., DIMINUTIVE PAP (DPAP)) TO COMPARE WITH DPAPs STORED IN EACH VALID ENTRY OF THE SELECTED S SETS TO DETERMINE SNOOP HIT OCCURRENCE  808

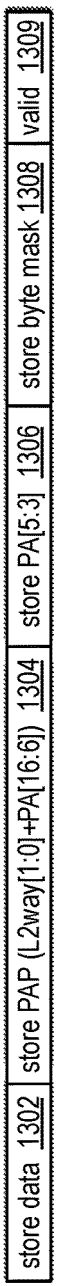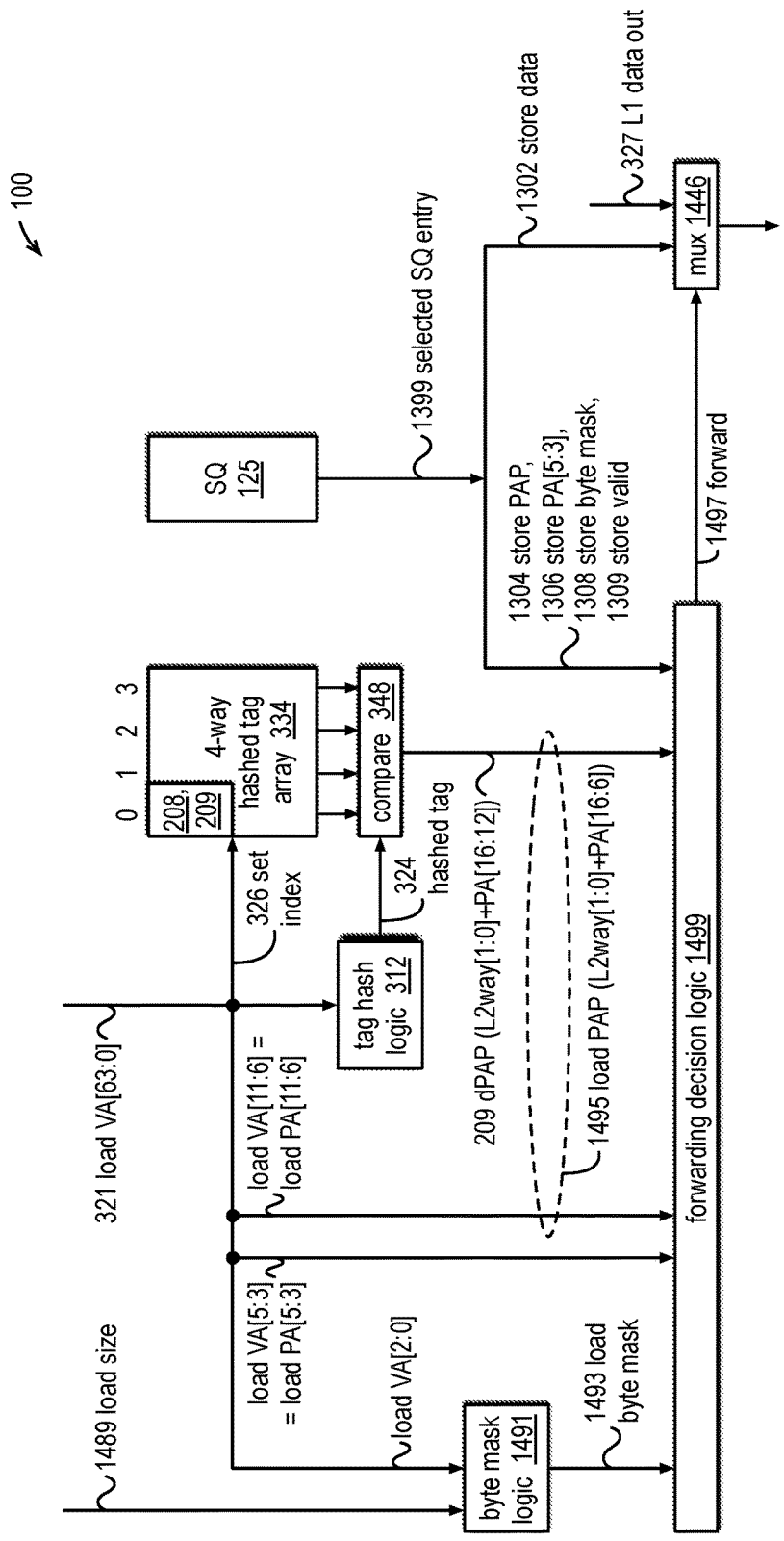

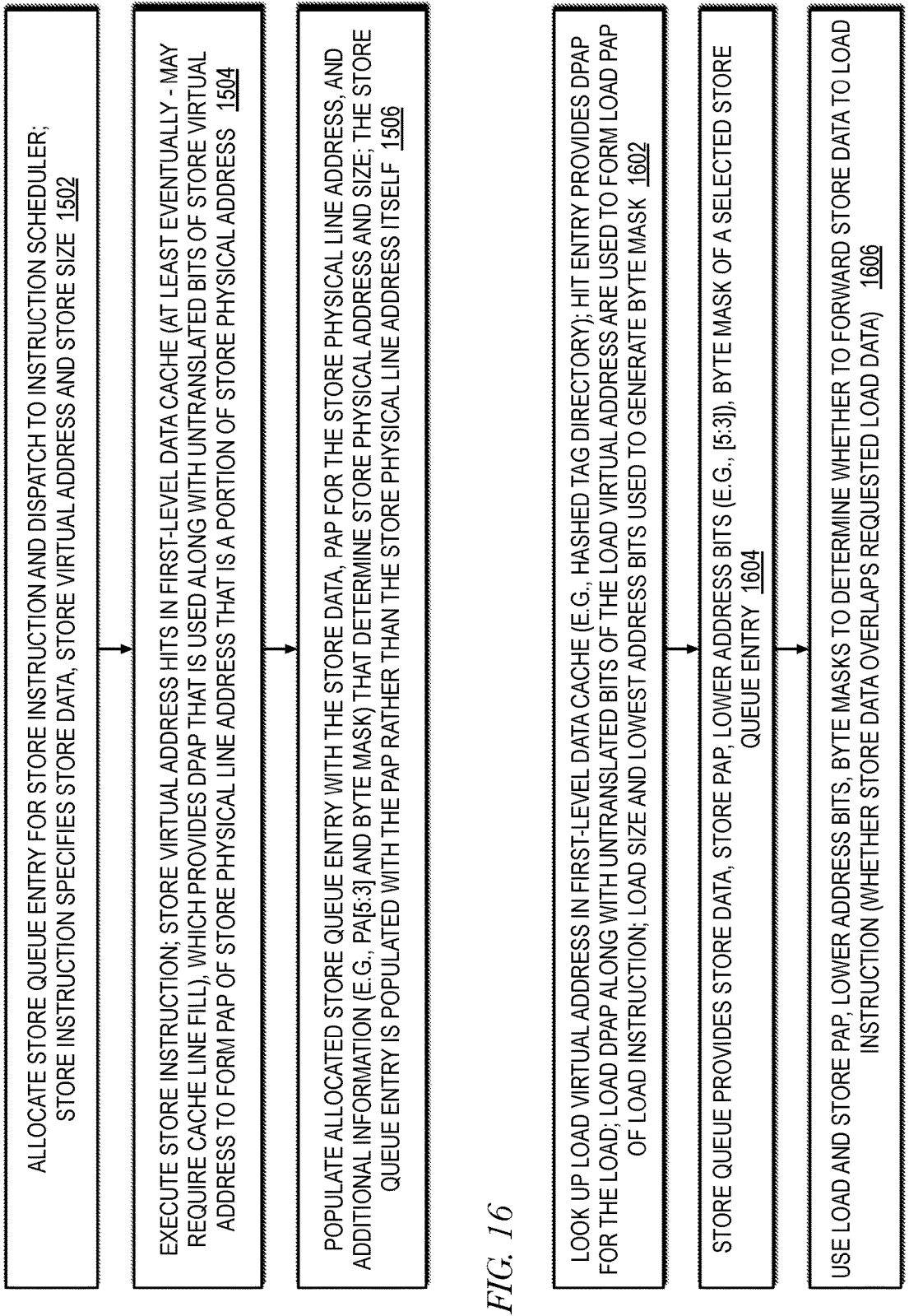

FIG. 15

- ALLOCATE STORE QUEUE ENTRY FOR STORE INSTRUCTION AND DISPATCH TO INSTRUCTION SCHEDULER; STORE INSTRUCTION SPECIFIES STORE DATA, STORE VIRTUAL ADDRESS AND STORE SIZE 1502
- EXECUTE STORE INSTRUCTION; STORE VIRTUAL ADDRESS HITS IN FIRST-LEVEL DATA CACHE (AT LEAST EVENTUALLY - MAY REQUIRE CACHE LINE FILL), WHICH PROVIDES DPAP THAT IS USED ALONG WITH UNTRANSLATED BITS OF STORE VIRTUAL ADDRESS TO FORM PAP OF STORE PHYSICAL LINE ADDRESS THAT IS A PORTION OF STORE PHYSICAL ADDRESS 1504
- POPULATE ALLOCATED STORE QUEUE ENTRY WITH THE STORE DATA, PAP FOR THE STORE PHYSICAL LINE ADDRESS, AND ADDITIONAL INFORMATION (E.G., PA[5:3] AND BYTE MASK) THAT DETERMINE STORE PHYSICAL ADDRESS AND SIZE; THE STORE QUEUE ENTRY IS POPULATED WITH THE PAP RATHER THAN THE STORE PHYSICAL LINE ADDRESS ITSELF 1506

FIG. 16

- LOOK UP LOAD VIRTUAL ADDRESS IN FIRST-LEVEL DATA CACHE (E.G., HASHED TAG DIRECTORY); HIT ENTRY PROVIDES DPAP FOR THE LOAD; LOAD DPAP ALONG WITH UNTRANSLATED BITS OF THE LOAD VIRTUAL ADDRESS ARE USED TO FORM LOAD PAP OF LOAD INSTRUCTION; LOAD SIZE AND LOWEST ADDRESS BITS USED TO GENERATE BYTE MASK 1602
- STORE QUEUE PROVIDES STORE DATA, STORE PAP, LOWER ADDRESS BITS (E.G., [5:3]), BYTE MASK OF A SELECTED STORE QUEUE ENTRY 1604
- USE LOAD AND STORE PAP, LOWER ADDRESS BITS, BYTE MASKS TO DETERMINE WHETHER TO FORWARD STORE DATA TO LOAD INSTRUCTION (WHETHER STORE DATA OVERLAPS REQUESTED LOAD DATA) 1606

STORE-TO-LOAD FORWARDING USING PHYSICAL ADDRESS PROXIES STORED IN STORE QUEUE ENTRIES

CROSS REFERENCE TO RELATED APPLICATION(S)

This application is a continuation-in-part of U.S. Non-Provisional application Ser. No. 17/315,262, filed May 7, 2021, which is hereby incorporated by reference in its entirety. This application is related to concurrently filed U.S. Non-Provisional Application entitled STORE-TO-LOAD FORWARDING USING PHYSICAL ADDRESS PROXIES TO IDENTIFY CANDIDATE SET OF STORE QUEUE ENTRIES, which is hereby incorporated by reference in its entirety.

BACKGROUND

Cache memories in microprocessors may have a significant impact on their performance. A cache memory is a memory within a processor that is small and fast relative to system memory, also referred to as main memory. The cache memory holds a copy of a small subset of the contents of system memory so that the processor can access the subset faster than the processor can access system memory. Generally, the cache tends to hold most recently used data by evicting least recently used data when allocating space for newly used data. In this manner, a cache memory reduces the execution time of load/store instructions by alleviating the need to read system memory to access the data specified by a load instruction and enabling a store instruction to immediately write its data to the cache memory without having to wait to write the data to system memory, for example. Generally, a cache memory stores a copy of system memory data in a quantum of a cache line, or cache block, e.g., 64 bytes. That is, when a cache memory allocates an entry for a memory address, the cache memory brings in an entire cache line implicated by the memory address, and when the cache memory has modified a copy of system memory, the cache memory writes back to system memory the entire modified cache line rather than merely the modified data.

The cache memories may significantly improve processor performance since a system memory access may require an order of magnitude more clock cycles than a cache memory access. Importantly, a load instruction, for example, may be stalled in its execution waiting for the data to be read from memory. To further exacerbate the situation, instructions dependent upon the load data may be prevented from being issued for execution, and instructions dependent upon the dependent instructions may also be prevented from being issued for execution, and so forth. If enough dependent instructions are stalled or waiting to issue and sufficient independent instructions are not within the execution window, execution units of the processor may sit idle, significantly reducing the instruction execution rate of the processor.

Even though a cache memory may improve load/store execution time by mitigating the need for memory accesses, nevertheless the time required to access the cache memory also affects the performance of the processor. This is particularly true for the cache memory that is directly accessed by load/store units of the processor, i.e., the cache memory at the lowest level in a processor that includes a cache hierarchy of multiple cache memories. That is, the performance of the processor may be significantly improved by reducing even a single clock cycle from the access time to the first level cache memory and/or enabling the cycle time of the processor to be made shorter by reducing the first level cache memory access time.

Finally, the performance of the processor is also significantly affected by the hit rate of the cache memory, which is affected by the capacity of the cache memory in terms of the number of bytes the cache memory is designed to hold. Cache memories hold other information besides the actual cache line data such as tags, status, and replacement policy information. Reducing the amount of other information held by the cache may enable the capacity of the cache to be bigger, i.e., to store more bytes of copies of memory data, thereby improving its hit rate. Furthermore, reducing the amount of other information held by the cache may enable the physical size of the cache—i.e., the area on the integrated circuit—to be smaller and to reduce the physical size of accompanying logic, e.g., comparators, again potentially enabling the capacity of the cache to be bigger, thereby improving its hit rate and improving the performance of the processor.

Another issue arises in the context of a system that includes multiple processors that share system memory and that each include a cache memory. In such systems, the processors must cooperate to ensure that when a processor reads from a memory address it receives the value most recently written to the address by any of the processors. For example, assume processors A and B each have a copy of a cache line at a memory address in their respective caches, and assume processor A modifies its copy of the cache line. The system needs to ensure that processor B receives the modified value when it subsequently reads from the address. This is commonly referred to as cache coherency.

A frequently employed protocol for attaining cache coherency is commonly referred to as a write-invalidate protocol that involves each processor snooping a shared bus used to access system memory. Using the example above, processor A broadcasts on the bus an invalidate transaction to announce that it intends to modify its copy of the cache line at the memory address. Processor B snoops the bus and sees the invalidate transaction. In response, processor B invalidates its copy of the cache line. When processor B later reads from the memory address, it broadcasts a read transaction on the bus. Processor A snoops the bus and sees the read transaction. In response, processor A provides the modified cache line to processor B and cancels the read transaction to the system memory. Processor A may also write back the modified cache line to system memory at this time.

As described above, cache memories hold and process other information besides the actual cache line data, some of which involves information for handling snooping the shared bus to attain cache coherency. By reducing the amount of cache coherence-related information held and processed by the cache, performance of the processor may be improved by increasing the speed of the cache and reducing its physical size.

SUMMARY

In one embodiment, the present disclosure provides a microprocessor that includes a physically-indexed physically-tagged second-level set-associative cache. Each entry in the second-level cache is uniquely identified by a set index and a way number of the second-level cache. The microprocessor also includes a store queue of entries. Each entry in the store queue holds information for a store instruction. The information includes store data to be written to a store physical address. A portion of the store physical address is a store physical line address. The information also includes a store physical address proxy (PAP) for the store physical line address. The store PAP specifies the set index and the way number of the entry in the second-level cache into which a cache line specified by the store physical line address is allocated. The microprocessor also includes a load unit configured to, during execution of a load instruction, use the store PAP held in an entry of the store queue in making a decision whether to forward to the load instruction the store data held in the entry of the store queue.

In another embodiment, the present disclosure provides a method for use in a microprocessor that includes a physically-indexed physically-tagged second-level set-associative cache. Each entry in the second-level cache is uniquely identified by a set index and a way number of the second-level cache. The microprocessor also includes a store queue of entries and a load unit. The method includes holding information for a store instruction in each entry of the store queue of entries. The information includes store data to be written to a store physical address. A portion of the store physical address is a store physical line address. The information also includes a store physical address proxy (PAP) for the store physical line address. The store PAP specifies the set index and the way number of the entry in the second-level cache into which a cache line specified by the store physical line address is allocated. The method also includes using, by the load unit during execution of a load instruction, the store PAP held in an entry of the store queue in making a decision whether to forward to the load instruction the store data held in the entry of the store queue.

In yet another embodiment, the present disclosure provides a non-transitory computer-readable medium having instructions stored thereon that are capable of causing or configuring a microprocessor. The microprocessor includes a physically-indexed physically-tagged second-level set-associative cache. Each entry in the second-level cache is uniquely identified by a set index and a way number of the second-level cache. The microprocessor also includes a store queue of entries. Each entry in the store queue holds information for a store instruction. The information includes store data to be written to a store physical address. A portion of the store physical address is a store physical line address. The information also includes a store physical address proxy (PAP) for the store physical line address. The store PAP specifies the set index and the way number of the entry in the second-level cache into which a cache line specified by the store physical line address is allocated. The microprocessor also includes a load unit configured to, during execution of a load instruction, use the store PAP held in an entry of the store queue in making a decision whether to forward to the load instruction the store data held in the entry of the store queue.

BRIEF DESCRIPTION OF THE DRAWINGS

FIG. 2 is an example block diagram of a cache entry of L1 data cache of FIG. 1 that employs PAPs to accomplish cache coherence in accordance with embodiments of the present disclosure.

FIG. 3 is an example block diagram illustrating the L1 data cache of FIG. 1 that employs PAPs to accomplish cache coherence in accordance with embodiments of the present disclosure.

FIG. 7 is an example flowchart illustrating operation of the cache subsystem of FIG. 6 to process a miss in the L1 data cache in furtherance of an inclusive cache policy in accordance with embodiments of the present disclosure.

FIG. 8 is an example flowchart illustrating operation of the cache subsystem of FIG. 6 to process a snoop request in accordance with embodiments of the present disclosure.

FIG. 13 is an example block diagram of a store queue entry of the store queue (SQ) of FIG. 1 that holds PAPs to accomplish store-to-load forwarding in accordance with embodiments of the present disclosure.

FIG. 14 is an example block diagram of portions of the processor of FIG. 1 used to perform store-to-load forwarding using PAPs in accordance with embodiments of the present disclosure.

FIG. 15 is an example flowchart illustrating processing of a store instruction that includes writing a store PAP into a store queue entry in accordance with embodiments of the present disclosure.

FIG. 16 is an example flowchart illustrating processing of a load instruction that includes using a load PAP and a store PAP from a store queue entry to decide whether to forward store data to the load instruction from the store queue entry in accordance with embodiments of the present disclosure.

DETAILED DESCRIPTION

Figure 1:
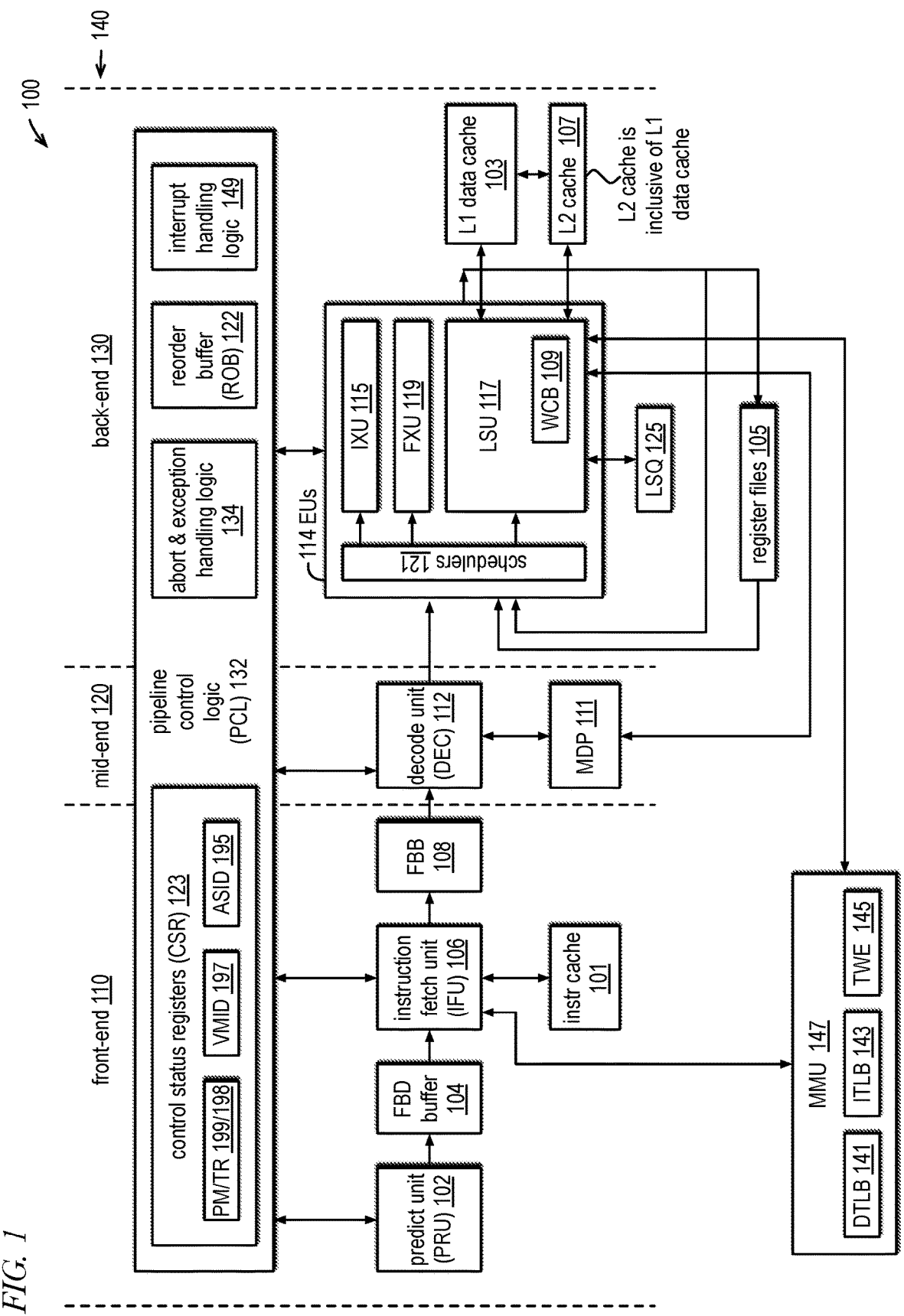
FIG. 1 is an example block diagram of a pipelined super-scalar, out-of-order execution microprocessor core that performs speculative execution of instructions in accordance with embodiments of the present disclosure.

FIG. 1 is an example block diagram of a pipelined super-scalar, out-of-order execution microprocessor core 100 that performs speculative execution of instructions in accordance with embodiments of the present disclosure. Speculative execution of an instruction means execution of the instruction during a time when at least one instruction older in program order than the instruction has not completed execution such that a possibility exists that execution of the older instruction will result in an abort, i.e., flush, of the instruction. The core 100 includes a cache memory subsystem that employs physical address proxies (PAP) to attain cache coherence as described herein. Although a single core 100 is shown, the PAP cache coherence techniques described herein are not limited to a particular number of cores. Generally, the PAP cache coherence embodiments may be employed in a processor conforming to various instruction set architectures (ISA), including but not limited to, x86, ARM, PowerPC, SPARC, MIPS. Nevertheless, some aspects of embodiments are described with respect to the microprocessor 100 conforming to the RISC-V ISA, as described in specifications set forth in Volumes I and II of "The RISC-V Instruction Set Manual," Document Version 20191213, promulgated by the RISC-V Foundation. These two volumes are herein incorporated by reference for all purposes. However, the embodiments of the PAP cache coherence techniques are not generally limited to RISC-V.

The core 100 has an instruction pipeline 140 that includes a front-end 110, mid-end 120, and back-end 130. The front-end 110 includes an instruction cache 101, a predict unit (PRU) 102, a fetch block descriptor (FBD) FIFO 104, an instruction fetch unit (IFU) 106, and a fetch block (FBlk) FIFO 108. The mid-end 120 include a decode unit (DEC) 112.

The back-end 130 includes a level-1 (L1) data cache 103, a level-2 (L2) cache 107, a register files 105, a plurality of execution units (EU) 114, and load and store queues (LSQ) 125. In one embodiment, the register files 105 include an integer register file, a floating-point register file and a vector register file. In one embodiment, the register files 105 include both architectural registers as well as microarchitectural registers. In one embodiment, the EUs 114 include integer execution units (IXU) 115, floating point units (FXU) 119, and a load-store unit (LSU) 117. The LSQ 125 hold speculatively executed load/store micro-operations, or load/store Ops, until the Op is committed. More specifically, the load queue 125 holds a load operation until it is committed, and the store queue 125 holds a store operation until it is committed. The store queue 125 may also forward store data that it holds to other dependent load Ops. When a load/store Op is committed, the load queue 125 and store queue 125 may be used to check for store forwarding violations. When a store Op is committed, the store data held in the associated store queue 125 entry is written into the L1 data cache 103 at the store address held in the store queue 125 entry. In one embodiment, the load and store queues 125 are combined into a single memory queue structure rather than separate queues. The DEC 112 allocates an entry of the LSQ 125 in response to decode of a load/store instruction.

The core 100 also includes a memory management unit (MMU) 147 coupled to the IFU 106 and LSU 117. The MMU 147 includes a data translation lookaside buffer (DTLB) 141, an instruction translation lookaside buffer (ITLB) 143, and a table walk engine (TWE) 145. In one embodiment, the core 100 also includes a memory dependence predictor (MDP) 111 coupled to the DEC 112 and LSU 117. The MDP 111 makes store dependence predictions that indicate whether store-to-load forwarding should be performed.

The LSU 117 includes a write combining buffer (WCB) 109 that buffers write requests sent by the LSU 117 to the DTLB 141 and to the L2 cache 107. In one embodiment, the L1 data cache 103 is a virtually-indexed virtually-tagged write-through cache. In the case of a store operation, when there are no older operations that could cause the store operation to be aborted, the store operation is ready to be committed, and the store data is written into the L1 data cache 103. The LSU 117 also generates a write request to "write-through" the store data to the L2 cache 107 and update the DTLB 141, e.g., to set a page dirty, or page modified, bit. The write request is buffered in the WCB 109. Eventually, at a relatively low priority, the store data associated with the write request will be written to the L2 cache 107. However, entries of the write combining buffer 109 are larger (e.g., 32 bytes) than the largest load and store operations (e.g., eight bytes). When possible, the WCB 109 merges, or combines, multiple write requests into a single entry of the WCB 109 such that the WCB 109 may make a potentially larger single write request to the L2 cache 107 that encompasses the store data of multiple store operations that have spatially-locality. The merging, or combining, is possible when the starting physical memory address and size of two or more store operations align and fall within a single entry of the WCB 109. For example, assume a first 8-byte store operation to 32-byte aligned physical address A, a second 4-byte store operation to physical address A+8, a third 2-byte store operation to physical address A+12, and a fourth 1-byte store operation to physical address A+14. The WCB 109 may combine the four store operations into a single entry and perform a single write request to the L2 cache 107 of the fifteen bytes at address A. By combining write requests, the WCB 109 may free up bandwidth of the L2 cache 107 for other requests, such as cache line fill requests from the L1 data cache 103 to the L2 cache 107 or snoop requests.

The microprocessor 110 may also include other blocks not shown, such as a load buffer, a bus interface unit, and various levels of cache memory above the instruction cache 101 and L1 data cache 103 and L2 cache 107, some of which may be shared by other cores of the processor. Furthermore, the core 100 may be multi-threaded in the sense that it includes the ability to hold architectural state (e.g., program counter, architectural registers) for multiple threads that share the back-end 130, and in some embodiments the mid-end 120 and front-end 110, to perform simultaneous multithreading (SMT).

The core 100 provides virtual memory support. Each process, or thread, running on the core 100 may have its own address space identified by an address space identifier (ASID). The core 100 may use the ASID to perform address translation. For example, the ASID may be associated with the page tables, or translation tables, of a process. The TLBs (e.g., DTLB 141 and ITLB 143) may include the ASID in their tags to distinguish entries for different processes. In the x86 ISA, for example, an ASID may correspond to a processor context identifier (PCID). The core 100 also provides machine virtualization support. Each virtual machine running on the core 100 may have its own virtual machine identifier (VIVID). The TLBs may include the VMID in their tags to distinguish entries for different virtual machines. Finally, the core 100 provides different privilege modes (PM), or privilege levels. The PM of the core 100 determines, among other things, whether or not privileged instructions may be executed. For example, in the x86 ISA there are four PMs, commonly referred to as Ring 0 through Ring 3. Ring 0 is also referred to as Supervisor level and Ring 3 is also referred to as User level, which are the two most commonly used PMs. For another example, in the RISC-V ISA, PMs may include Machine (M), User (U), Supervisor (S) or Hypervisor Supervisor (HS), Virtual User (VU), and Virtual Supervisor (VS). In the RISC-V ISA, the S PM exists only in a core without virtualization supported or enabled, whereas the HS PM exists when virtualization is enabled, such that S and HS are essentially non-distinct PMs. For yet another example, the ARM ISA includes exception levels (EL0, EL1, EL2 and EL3).

As used herein and as shown in FIG. 1, a translation context (TC) of the core 100 (or of a hardware thread in the case of a multi-threaded core) is a function of the ASID, VMID, and/or PM or a translation regime (TR), which is based on the PM. In one embodiment, the TR indicates whether address translation is off (e.g., M mode) or on, whether one level of address translation is needed (e.g., U mode, S mode and HS mode) or two levels of address translation is needed (VU mode and VS mode), and what form of translation table scheme is involved. For example, in a RISC-V embodiment, the U and S privilege modes (or U and HS, when the hypervisor extension is active) may share a first TR in which one level of translation is required based on the ASID, VU and VS share a second TR in which two levels of translation are required based on the ASID and VMID, and M privilege level constitutes a third TR in which no translation is performed, i.e., all addresses are physical addresses.

Pipeline control logic (PCL) 132 is coupled to and controls various aspects of the pipeline 140 which are described in detail herein. The PCL 132 includes a ReOrder Buffer (ROB) 122, interrupt handling logic 149, abort and exception-handling logic 134, and control and status registers (CSR) 123. The CSRs 123 hold, among other things, the PM 199, VMID 197, and ASID 195 of the core 100, or one or more functional dependencies thereof (such as the TR and/or TC). In one embodiment (e.g., in the RISC-V ISA), the current PM 199 does not reside in a software-visible CSR 123; rather, the PM 199 resides in a microarchitectural register. However, the previous PM 199 is readable by a software read of a CSR 123 in certain circumstances, such as upon taking of an exception. In one embodiment, the CSRs 123 may hold a VMID 197 and ASID 195 for each TR or PM.

The pipeline units may signal a need for an abort, as described in more detail below, e.g., in response to detection of a mis-prediction (e.g., by a branch predictor of a direction or target address of a branch instruction, or of a mis-prediction that store data should be forwarded to a load Op in response to a store dependence prediction, e.g., by the MDP 111) or other microarchitectural exception, architectural exception, or interrupt. Examples of architectural exceptions include an invalid opcode fault, debug breakpoint, or illegal instruction fault (e.g., insufficient privilege mode) that may be detected by the DEC 112, a page fault, permission violation or access fault that may be detected by the LSU 117, and an attempt to fetch an instruction from a non-executable page or a page the current process does not have permission to access that may be detected by the IFU 106. In response, the PCL 132 may assert flush signals to selectively flush instructions/Ops from the various units of the pipeline 140. Conventionally, exceptions are categorized as either faults, traps, or aborts. The term "abort" as used herein is not limited by the conventional categorization of exceptions. As used herein, "abort" is a microarchitectural mechanism used to flush instructions from the pipeline 140 for many purposes, which encompasses interrupts, faults and traps. Purposes of aborts include recovering from micro-architectural hazards such as a branch mis-prediction or a store-to-load forwarding violation. The microarchitectural abort mechanism may also be used to handle architectural exceptions and for architecturally defined cases where changing the privilege mode requires strong in-order synchronization. In one embodiment, the back-end 130 of the processor 100 operates under a single PM, while the PM for the front-end 110 and mid-end 120 may change (e.g., in response to a PM-changing instruction) while older instructions under an older PM continue to drain out of the back-end 130. Other blocks of the core 100, e.g., DEC 112, may maintain shadow copies of various CSRs 123 to perform their operations.

The PRU 102 maintains the program counter (PC) and includes predictors that predict program flow that may be altered by control flow instructions, such as branch instructions. In one embodiment, the PRU 102 includes a next index predictor (NIP), a branch target buffer (BTB), a main conditional branch predictor (CBP), a secondary conditional branch predictor (BMP), an indirect branch predictor (IBP), and a return address predictor (RAP). As a result of predictions made by the predictors, the core 100 may speculatively execute instructions in the instruction stream of the predicted path.

The PRU 102 generates fetch block descriptors (FBD) that are provided to the FBD FIFO 104 in a first-in-first-out manner. Each FBD describes a fetch block (FBlk or FB). An FBlk is a sequential set of instructions. In one embodiment, an FBlk is up to sixty-four bytes long and may contain as many as thirty-two instructions. An FBlk ends with either a branch instruction to be predicted, an instruction that causes a PM change or that requires heavy abort-based synchronization (aka "stop" instruction), or an indication that the run of instructions continues sequentially into the next FBlk. An FBD is essentially a request to fetch instructions. An FBD may include the address and length of an FBlk and an indication of the type of the last instruction. The IFU 106 uses the FBDs to fetch FBlks into the FBlk FIFO 108, which feeds fetched instructions to the DEC 112. The FBD FIFO 104 enables the PRU 102 to continue predicting FBDs to reduce the likelihood of starvation of the IFU 106. Likewise, the FBlk FIFO 108 enables the IFU 106 to continue fetching FBlks to reduce the likelihood of starvation of the DEC 112. The core 100 processes FBlks one at a time, i.e., FBlks are not merged or concatenated. By design, the last instruction of an FBlk can be a branch instruction, a privilege-mode-changing instruction, or a stop instruction. Instructions may travel through the pipeline 140 from the IFU 106 to the DEC 112 as FBlks, where they are decoded in parallel.

The DEC 112 decodes architectural instructions of the FBlks into micro-operations, referred to herein as Ops. The DEC 112 dispatches Ops to the schedulers 121 of the EUs 114. The schedulers 121 schedule and issue the Ops for execution to the execution pipelines of the EUs, e.g., IXU 115, FXU 119, LSU 117. The EUs 114 receive operands for the Ops from multiple sources including: results produced by the EUs 114 that are directly forwarded on forwarding busses—also referred to as result busses or bypass busses—back to the EUs 114 and operands from the register files 105 that store the state of architectural registers as well as microarchitectural registers, e.g., renamed registers. In one embodiment, the EUs 114 include four IXU 115 for executing up to four Ops in parallel, two FXU 119, and an LSU 117 that is capable of executing up to four load/store Ops in parallel. The instructions are received by the DEC 112 in program order, and entries in the ROB 122 are allocated for the associated Ops of the instructions in program order. However, once dispatched by the DEC 112 to the EUs 114, the schedulers 121 may issue the Ops to the individual EU 114 pipelines for execution out of program order.

The PRU 102, IFU 106, DEC 112, and EUs 114, along with the intervening FIFOs 104 and 108, form a concatenated pipeline 140 in which instructions and Ops are processed in mostly sequential stages, advancing each clock cycle from one stage to the next. Each stage works on different instructions in parallel. The ROB 122 and the schedulers 121 together enable the sequence of Ops and associated instructions to be rearranged into a data-flow order and to be executed in that order rather than program order, which may minimize idling of EUs 114 while waiting for an instruction requiring multiple clock cycles to complete, e.g., a floating-point Op or cache-missing load Op.

Many structures within the core 100 address, buffer, or store information for an instruction or Op by reference to an FBlk identifier. In one embodiment, checkpoints for abort recovery are generated for and allocated to FBlks, and the abort recovery process may begin at the first instruction of the FBlk containing the abort-causing instruction.

In one embodiment, the DEC 112 converts each FBlk into a series of up to eight OpGroups. Each OpGroup consists of either four sequential Ops or, if there are fewer than four Ops in the FBlk after all possible four-op OpGroups for an FBlk have been formed, the remaining Ops of the FBlk. Ops from different FBlks are not concatenated together into the same OpGroup. Because some Ops can be fused from two instructions, an OpGroup may correspond to up to eight instructions. The Ops of the OpGroup may be processed in simultaneous clock cycles through later DEC 112 pipe stages, including rename and dispatch to the EU 114 pipelines. In one embodiment, the MDP 111 provides up to four predictions per cycle, each corresponding to the Ops of a single OpGroup. Instructions of an OpGroup are also allocated into the ROB 122 in simultaneous clock cycles and in program order. The instructions of an OpGroup are not, however, necessarily scheduled for execution together.

In one embodiment, each of the EUs 114 includes a dedicated scheduler 121. In an alternate embodiment, a scheduler 121 common to all the EUs 114 (and integrated with the ROB 122 according to one embodiment) serves all the EUs 114. In one embodiment, each scheduler 121 includes an associated buffer (not shown) that receives Ops dispatched by the DEC 112 until the scheduler 121 issues the Op to the relevant EU 114 pipeline for execution, namely when all source operands upon which the Op depends are available for execution and an EU 114 pipeline of the appropriate type to execute the Op is available.

The PRU 102, IFU 106, DEC 112, each of the execution units 114, and PCL 132, as well as other structures of the core 100, may each have their own pipeline stages in which different operations are performed. For example, in one embodiment, the DEC 112 has a pre-decode stage, an extract stage, a rename stage, and a dispatch stage.

The PCL 132 tracks instructions and the Ops into which they are decoded throughout their lifetime. The ROB 122 supports out-of-order instruction execution by tracking Ops from the time they are dispatched from DEC 112 to the time they retire. In one embodiment, the ROB 122 has entries managed as a FIFO, and the ROB 122 may allocate up to four new entries per cycle at the dispatch stage of the DEC 112 and may deallocate up to four oldest entries per cycle at Op retire. In one embodiment, each ROB entry includes an indicator that indicates whether the Op has completed its execution and another indicator that indicates whether the result of the Op has been committed to architectural state. More specifically, load and store Ops may be committed subsequent to completion of their execution. Still further, an Op may be committed before it is retired.

Embodiments of a cache subsystem are described herein that advantageously enable cache coherency attainment with higher performance and/or reduced size using PAPs.

FIG. 2 is an example block diagram of a cache entry 201 of L1 data cache 103 of FIG. 1 that employs PAPs to accomplish cache coherence in accordance with embodiments of the present disclosure. The L1 data cache entry 201 is used in the L1 data cache 103 embodiment of FIG. 3 described in more detail below. The L1 data cache entry 201 includes cache line data 202, a virtual address tag 204, a status field 206, a hashed tag field 208, and a diminutive physical address proxy (dPAP) field 209. The cache line data 202 is the copy of the data brought into the L1 data cache 103 from system memory indirectly through a higher level of the cache memory hierarchy, namely the L2 cache 107.

The tag 204 is upper bits (e.g., tag bits 322 of FIG. 3) of the virtual memory address (e.g., virtual load/store address 321 of FIG. 3) specified by the operation that brought the cache line into the L1 data cache 103, e.g., the virtual memory address specified by a load/store operation. That is, when an entry 201 in the L1 data cache 103 is allocated, the tag bits 322 of the virtual memory address 321 are written to the virtual address tag 204 of the entry 201. When the L1 data cache 103 is subsequently accessed (e.g., by a subsequent load/store operation), the virtual address tag 204 is used to determine whether the access hits in the L1 data cache 103. Generally speaking, the L1 data cache 103 uses lower bits (e.g., set index bits 326 of FIG. 3) of the virtual memory address to index into the L1 data cache 103 and uses the remaining bits of the virtual address 321 above the set index bits 326 as the tag bits. To illustrate by way of example, assume a 64 kilobyte (KB) L1 data cache 103 arranged as a 4-way set associative cache having 64-byte cache lines; address bits [5:0] are an offset into the cache line, virtual address bits [13:6] (set index bits) are used as the set index, and virtual address bits [N−1:14] (tag bits) are used as the tag, where N is the number of bits of the virtual memory address, where N is 63 in the embodiment of FIG. 3.

The status 206 indicates the state of the cache line. More specifically, the status 206 indicates whether the cache line data is valid or invalid. Typically, the status 206 also indicates whether the cache line has been modified since it was brought into the L1 data cache 103. The status 206 may also indicate whether the cache line is exclusively held by the L1 data cache 103 or whether the cache line is shared by other cache memories in the system. An example protocol used to maintain cache coherency defines four possible states for a cache line: Modified, Exclusive, Shared, Invalid (MESI).

The hashed tag 208 may be a hash of the tag bits 322 of FIG. 3 of the virtual memory address 321, as described in more detail below. Advantageously, the hashed tag 208 may be used to generate a predicted early miss indication, e.g., miss 328 of FIG. 3, and may be used to generate a predicted early way select signal, e.g., way select 342 of FIG. 3, as described in more detail with respect to FIG. 3.

Figure 6:
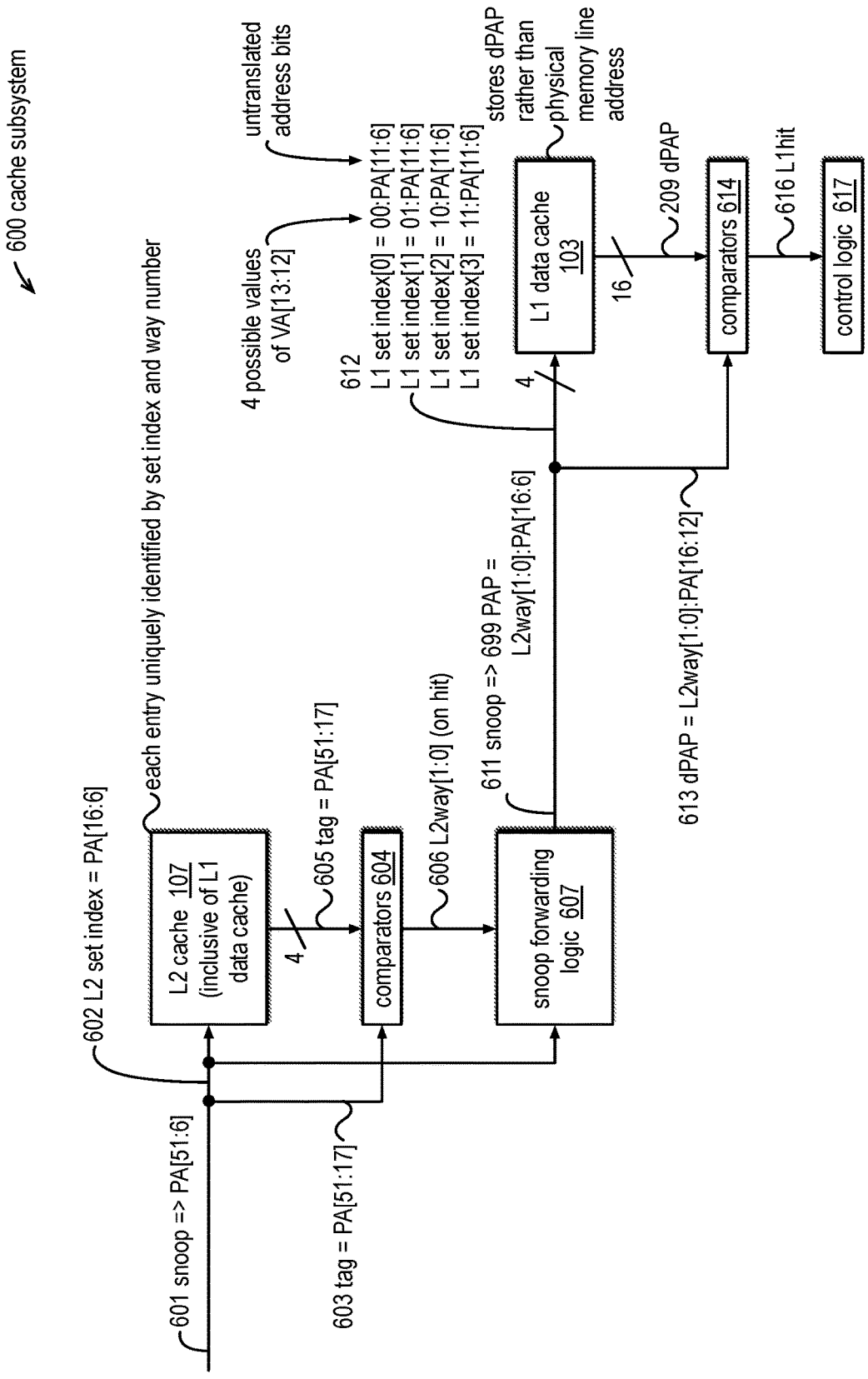
FIG. 6 is an example block diagram of a cache subsystem that employs PAPs to accomplish cache coherence in accordance with embodiments of the present disclosure.

The dPAP 209 is all or a portion of a physical address proxy (PAP), e.g., PAP 699 of FIG. 6. As described herein, the L2 cache 107 is inclusive of the L1 data cache 103. That is, each cache line of memory allocated into the L1 data cache 103 is also allocated into the L2 cache 107, and when the L2 cache 107 evicts the cache line, the L2 cache 107 also causes the L1 data cache 103 to evict the cache line. A PAP is a forward pointer to the unique entry in the L2 cache 107 (e.g., L2 entry 401 of FIG. 4) that holds a copy of the cache line held in the entry 201 of the L1 data cache 103. For example, in the embodiments of FIGS. 6 and 9, the dPAP 209 is the PAP less the untranslated physical address PA[11:6] bits that are used in the L1 set index. That is, the dPAP is the L2 way and the translated physical address bits PA[16:12] of the set index of the L2 cache 107 set containing the entry 401 that holds the copy of the L1 data cache 103 cache line. For another example, in the embodiment of FIG. 11, the dPAP is the entire PAP, e.g., all the bits of the L2 way and L2 set index that point to the entry 401 in the L2 cache 107 that holds the copy of the L1 data cache 103 cache line. Uses of the dPAP 209 and PAP are described in more detail herein.

FIG. 3 is an example block diagram illustrating the L1 data cache 103 of FIG. 1 that employs PAPs to accomplish cache coherence in accordance with embodiments of the present disclosure. In the embodiment of FIG. 3, the L1 data cache 103 is a virtual cache, i.e., it is virtually-indexed and virtually-tagged. In the embodiment of FIG. 3, the DTLB 141 of FIG. 1 is a second-level TLB, and the processor 100 includes no first-level TLB. The L1 data cache 103 includes a tag array 332, a data array 336, a hashed tag array 334, a multiplexer 342, a comparator 344, a multiplexer 346, and tag hash logic 312. The LSU 117 generates a virtual load/store address VA[63:0] and provides to the L1 data cache 103 a portion thereof VA[63:6] 321 used to specify a line of memory that may be stored in the L1 data cache 103. The virtual address 321 includes a tag 322 portion (e.g., bits [63:14]) and a set index 326 portion (e.g., bits [13:6]). The L1 data cache 103 also includes an allocate way input 308 for allocating an entry into the L1 data cache 103. The L1 data cache 103 also includes a data in input 325 for writing data into the L1 data cache 103, e.g., during a store operation and during a cache line allocation.

The L1 data cache 103 also includes a hit output 352, early miss prediction 328, and a data out output 227. The tag array 332 and data array 336 are random access memory arrays. In the embodiment of FIG. 3, the L1 data cache 103 is arranged as a 4-way set associative cache; hence, the tag array 332 and data array 336 are arranged as 4-way set associative memory arrays. However, other embodiments are contemplated in which the associativity has a different number of ways than four, including direct-mapped and fully associative embodiments. The set index 326 selects the set of entries on each allocation or access, e.g., load/store operation.

In the embodiment of FIG. 3, each entry of the L1 data cache 103 is structured as the entry 201 of FIG. 2, having cache line data 202, a tag 204, a status 206, a hashed tag 208, and a dPAP 209. The data array 336 holds the cache line data 202 associated with each of the entries 201 of the L1 data cache 103. The tag array 332 holds the tag 204 associated with each of the entries 201 of the L1 data cache 103. The hashed tag array 334, also referred to as a hashed address directory 334, holds the hashed tag 208 and dPAP 209 associated with each of the entries 201 of the L1 data cache 103. In one embodiment, the status 206 of each entry is also stored in the tag array 332, whereas in another embodiment the L1 data cache 103 includes a separate memory array for storing the status 206 of the entries. Although in the embodiment of FIG. 3 the data array 336 and tag array 332 are separate, other embodiments are contemplated in which the data and tag (and status) reside in the same memory array.

The tag hash logic 312 hashes the tag 322 portion of the virtual load/store address 321 to generate the hashed tag 324. That is, the tag 322 is an input to a hash function performed by tag hash logic 312 that outputs the hashed tag 324. The hash function performs a logical and/or arithmetic operation on its input bits to generate output bits. For example, in one embodiment, the hash function is a logical exclusive-OR on at least a portion of the tag 322 bits. The number of output bits of the hash function is the size of the hashed tag 324 and the hashed tag field 208 of the data cache entry 201. The hashed tag 324 is provided as an input to the hashed tag array 334 for writing into the hashed tag 208 of the selected entry 201 of the hashed tag array 334, e.g., during an allocation. Similarly, a dPAP 323 obtained from the L2 cache 107 during an allocation (as described with respect to FIG. 7) are written into the dPAP 209 of the selected entry 201 of the hashed tag array 334 during an allocation. The set index 326 selects the set of entries of the hashed tag array 334. In the case of an allocation, the hashed tag 324 and dPAP 323 are written into the hashed tag 208 and dPAP 209 of the entry 201 of the way selected by an allocate way input 308 of the selected set. In the case of an access, comparator 348 compares the hashed tag 324 with each of the hashed tags 208 of the selected set. If there is a valid match, the early miss signal 328 is false and the way select 341 indicates the matching way; otherwise, the early miss signal 328 is true. Although it may not be used to execute a load/store operation, the dPAP 323 stored in the dPAP field 202 of the L1 entry 201 is used to process a snoop request to attain cache coherency, as described in more detail with respect to FIGS. 6 through 12.

Because the hashed tag 324 and the hashed tags 208 are small (e.g., 16 bits as an illustrative example) relative to the tag 322 and tags 204 (e.g., 54 bits as an illustrative example), the comparison performed by comparator 348 may be faster than the comparison performed by comparator 344 (described more below), for example. Therefore, the way select 341 may be signaled by an earlier stage in the L1 data cache 103 pipeline than an embodiment that relies on a comparison of the tags 204 of the tag array 332 to generate a way select. This may be advantageous because it may shorten the time to data out 227.

Additionally, the early miss prediction 328 may be signaled by an earlier stage than the stage that signals the hit indicator 352. This may be advantageous because it may enable a cache line fill requestor (not shown) to generate a cache line fill request to fill a missing cache line earlier than an embodiment that would rely on a comparison of the tags 204 in the tag array 332 to detect a miss. Thus, the hashed tag array 334 may enable a high performance, high frequency design of the processor 100.

It is noted that due to the nature of the hashed tag 324, if the early miss indicator 328 indicates a false value, i.e., indicates a hit, the hit indication may be incorrect, i.e., the hit indicator 352 may subsequently indicate a false value, i.e., a miss. Thus, the early miss indicator 328 is a prediction, not necessarily a correct miss indicator. This is because differing tag 322 values may hash to the same value. However, if the early miss indicator 328 indicates a true value, i.e., indicates a miss, the miss indication is correct, i.e., the hit indicator 352 will also indicate a miss, i.e., will indicate a false value. This is because if two hash results are not equal (assuming they were hashed using the same hash algorithm), then they could not have been generated from equal inputs, i.e., matching inputs.

The tag 322 is provided as an input to the tag array 332 for writing into the tag 204 field of the selected entry of the tag array 332, e.g., during an allocation. The set index 326 selects the set of entries of the tag array 332. In the case of an allocation, the tag 322 is written into the tag 204 of the entry of the way selected by the allocate way input 308 of the selected set. In the case of an access (e.g., a load/store operation), the mux 342 selects the tag 204 of the way selected by the early way select 341, and the comparator 344 compares the tag 322 with the tag 204 of the selected set. If there is a valid match, the hit signal 352 is true; otherwise, the hit signal 352 is false. In one embodiment, the cache line fill requestor advantageously uses the early miss prediction 328 provided by the hashed tag array 334 in order to generate a fill request as soon as possible, rather than waiting for the hit signal 352. However, in embodiments of the LSU 117 that employ the L1 data cache 103 of FIG. 3, the cache line fill requestor is also configured to examine both the early miss prediction 328 and the hit indicator 352, detect an instance in which the early miss prediction 328 predicted a false hit, and generate a fill request accordingly.

The data array 336 receives the data in input 325 for writing into the cache line data 202 field of the selected entry of the data array 336, e.g., during a cache line allocation or a store operation. The set index 326 selects the set of entries of the data array 336. In the case of an allocation, the way of the selected set is selected by the allocate way input 308, and in the case of a memory access operation (e.g., load/store operation) the way is selected by the way select signal 341. In the case of a read operation (e.g., load operation), the mux 346 receives the cache line data 202 of all four ways and selects one of the ways based on the way select signal 341, and the cache line data 202 selected by the mux 346 is provided on the data out output 227.

Figure 4:
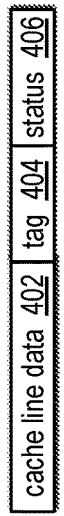
FIG. 4 is an example block diagram of a cache entry of the L2 cache of FIG. 1 that employs PAPs to accomplish cache coherence in accordance with embodiments of the present disclosure.

FIG. 4 is an example block diagram of a cache entry 401 of L2 cache 107 of FIG. 1 that employs PAPs to accomplish cache coherence in accordance with embodiments of the present disclosure. The L2 cache entry 401 is used in the physically-indexed physically-tagged L2 cache 107 embodiment of FIG. 5 described in more detail below. That is, the tag field 404 holds a physical address tag, rather than a virtual address tag. Also, the cache entry 401 of FIG. 4 does not include a hashed tag field 208 nor a dPAP field 209 as in FIG. 2. Otherwise, the cache entry 401 of FIG. 4 is similar in many respects to the cache entry 201 of FIG. 2, e.g., the status field 406 is similar to the status field 206 of FIG. 2.

Figure 5:
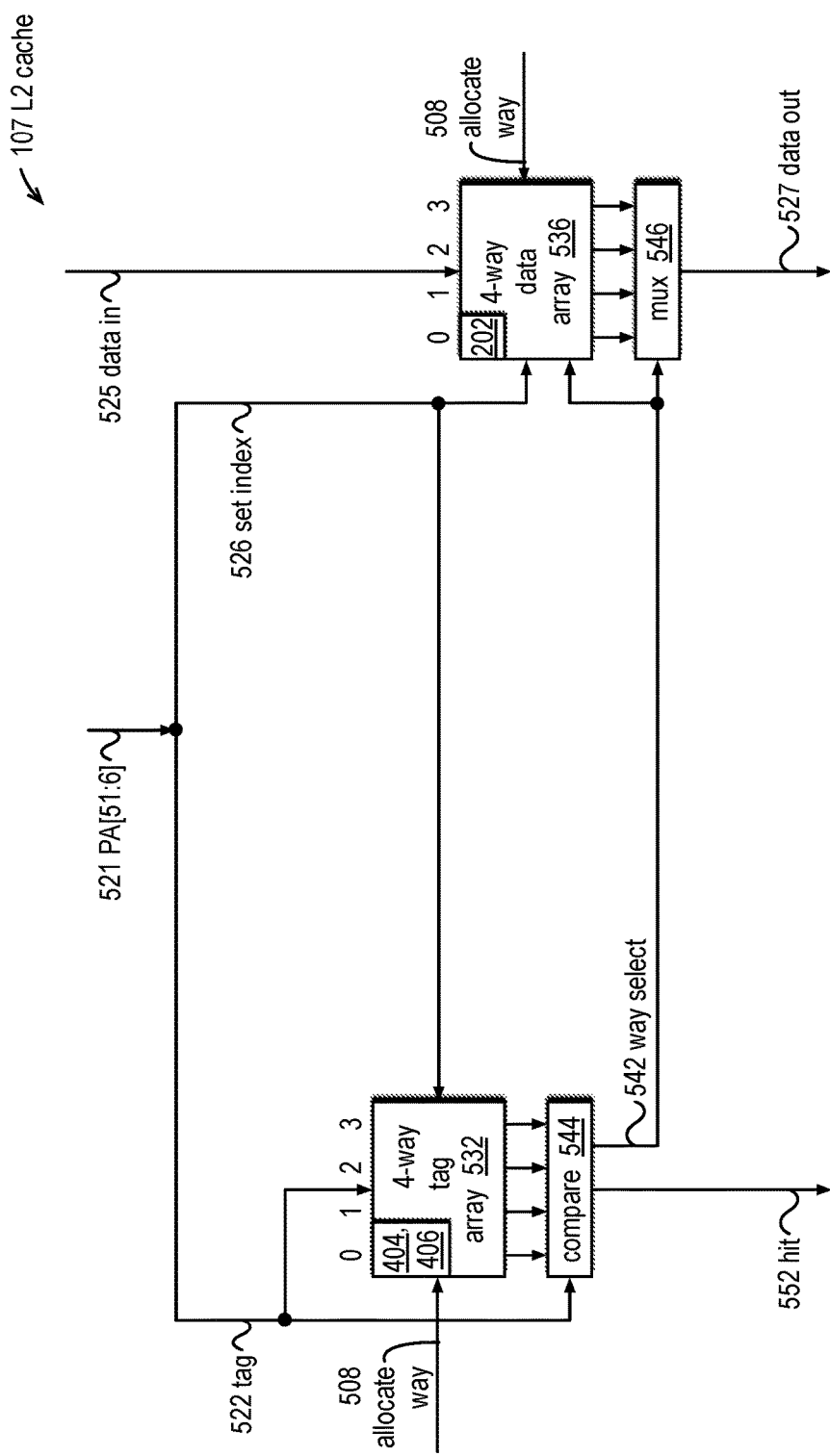
FIG. 5 is an example block diagram illustrating the L2 cache of FIG. 1 that employs PAPs to accomplish cache coherence in accordance with embodiments of the present disclosure.

FIG. 5 is an example block diagram illustrating the L2 cache 107 of FIG. 1 that employs PAPs to accomplish cache coherence in accordance with embodiments of the present disclosure. The DTLB 141 of FIG. 1 receives the virtual load/store address 321 of FIG. 2 and provides to the L2 cache 107 a physical memory line address PA[51:6] 521 that is the translation of the virtual load/store address 321. More specifically, physical memory line address 521 bits PA[51:12] are translated from the virtual load/store address 321 bits [63:12]. The physical memory line address 521 comprises a tag 522 portion and a set index 526 portion. In some respects, the L2 cache 107 of FIG. 5 is similar and operates similarly to the L1 data cache 103 of FIG. 3 in that it analogously includes a tag array 532, a data array 536, a comparator 544, a multiplexer 546, an allocate way input 508 for allocating an entry into the L2 cache 107, and a data in input 525 for writing data into the L2 cache 107. However, the L2 cache 107 does not analogously include the tag hash logic 312, hashed tag array 334, comparator 348, nor multiplexer 342 of FIG. 3. The L2 cache 107 is physically-indexed and physically-tagged. That is, tag 522 is the tag portion (e.g., bits [51:17]) of the physical memory line address 521, and the set index 526 is the index portion (e.g., bits [16:6]) of the physical memory line address 521. Finally, the comparator 544 compares the tag 522 with the tag 404 of all ways of the selected set. If there is a valid match, the hit signal 552 is true and a way select signal 542, which indicates the matching way, is provided to mux 546; otherwise, the hit signal 552 is false. As described herein, a cache line of memory associated with a physical memory line address can only reside in one entry 401 of the L2 cache 107, and a PAP points to the one entry 401 of the L2 cache 107 that holds the copy of the cache line associated with the physical memory line address for the which the PAP is a proxy.

FIG. 6 is an example block diagram of a cache subsystem 600 that employs PAPs to accomplish cache coherence in accordance with embodiments of the present disclosure. The cache subsystem 600 includes the L2 cache 107 of FIG. 5 that includes entries 401 of FIG. 4 and the L1 data cache 103 of FIG. 3 that includes entries 201 of FIG. 2. The cache subsystem 600 has an inclusive allocation policy such that each cache line of memory allocated into the L1 data cache 103 is also allocated into the L2 cache 107, and when the L2 cache 107 evicts the cache line, the L2 cache 107 also causes the L1 data cache 103 to evict the cache line. Because the L2 cache 107 is a physically-indexed physically-tagged cache, a cache line of memory may reside only in a single entry of the L2 cache 107. As described herein, each valid L1 entry 201 of the L1 data cache 103 includes a field, referred to as the dPAP 209 of FIG. 2. The dPAP 209, along with relevant bits of the L1 set index used to select the set of the L1 data cache 103 that includes the L1 entry 201, points to the entry 401 of the L2 cache 107 that holds a copy of the cache line of memory allocated into the L1 entry 201. The dPAP 209 along with the relevant bits of the L1 set index are referred to herein as the physical address proxy (PAP) 699 of FIG. 6, which may be considered a forward pointer to the L2 cache 107 that holds a copy of the cache line of memory allocated into the L1 entry 201. The PAP 699 is used to accomplish cache coherency in a more efficient manner, both in terms of timing and storage space, than using a full physical memory line address to accomplish cache coherency, as described herein. The inclusive allocation policy is further described with respect to FIG. 7.

In the embodiment of FIG. 6, the L2 cache 107 is a 512 KB 4-way set associative cache memory whose entries each store a 64-byte cache line. Thus, the L2 cache 107 includes an 11-bit L2 set index 602 that receives physical address bits PA[16:6] to select one of 2048 sets. However, other embodiments are contemplated in which the L2 cache 107 has a different cache line size, different set associativity, and different size. In the embodiment of FIG. 6, the L1 data cache 103 is a 64 KB 4-way set associative cache memory whose entries each store a 64-byte cache line. Thus, the L1 data cache 103 includes an 8-bit L1 set index 612 to select one of 256 sets. However, other embodiments are contemplated in which the L1 data cache 103 has a different cache line size, different set associativity, and different size. In the embodiment of FIG. 6, the lower six bits [5:0] of the L1 set index 612 receive physical address bits PA[11:6]. The upper two bits [7:6] are described in more detail below. In particular, in the example of FIG. 6, the lower six bits [5:0] of the L1 set index 612 correspond to untranslated virtual address bits VA[11:6] that are mathematically equivalent to untranslated physical address bits PA[11:6] which correspond to the lower six bits [5:0] of the L2 set index 602.

FIG. 6 illustrates aspects of processing of a snoop request 601 by the cache subsystem 600, which is also described in FIG. 8, to ensure cache coherency between the L2 cache 107, L1 data cache 103 and other caches of a system that includes the core 100 of FIG. 1, such as a multi-processor or multi-core system. The snoop request 601 specifies a physical memory line address PA[51:6], of which PA[16:6] correspond to the L2 set index 602 to select a set of the L2 cache 107. Comparators 604 compare a tag portion 603 of the snoop request 601 against the four tags 605 of the selected set. The tag portion 603 corresponds to physical address bits PA[51:17]. Each of the four tags 605 is tag 404 of FIG. 4, which is the physical address bits PA[51:17] stored during an allocation into the L2 cache 107. If there is a tag match of a valid entry 401, the hit entry 401 is indicated on an L2way number 606, which is preferably a two-bit value encoded to indicate one of four ways, which is provided to snoop forwarding logic 607. The snoop forwarding logic 607 forwards the snoop request 601 to the L1 data cache 103 as forwarded snoop request 611.

The forwarded snoop request 611 is similar to the snoop request 601 except that the physical memory line address PA[51:6] is replaced with the PAP 699. The PAP 699 points to the snoop request 601 hit entry 401 in the L2 cache 107. That is, the PAP 699 is the physical address bits PA[16:6] that select the set of the L2 cache 107 that contains the hit entry 401 combined with the L2way number 606 of the hit entry 401. The PAP 699 is significantly fewer bits than the physical memory line address PA[51:6], which may provide significant advantages such as improved timing and reduced storage requirements, as described in more detail below. In the embodiment of FIG. 6, the PAP 699 is thirteen bits, whereas the physical memory line address is 46 bits, for a saving of 33 bits per entry of the L1 data cache 103, although other embodiments are contemplated in which the different bit savings are enjoyed.

In the embodiment of FIG. 6, the untranslated address bits PA[11:6] are used as the lower six bits [5:0] of the L1 set index 612. During a snoop request, the upper two bits [7:6] of the L1 set index 612 are generated by the L1 data cache 103. More specifically, for the upper two bits [7:6] of the L1 set index 612, the L1 data cache 103 generates all four possible combinations of the two bits. Thus, four sets of the L1 data cache 103 are selected in the embodiment of FIG. 6. The upper two bits [7:6] of the L1 set index 612 for processing of the forwarded snoop request 611 correspond to virtual address bits VA[13:12] of a load/store address during an allocation or lookup operation. Comparators 614 compare a dPAP 613 portion of the PAP 699 of the forwarded snoop request 611 against the dPAPs 209 of each entry 201 of each way of each of the four selected sets of the L1 data cache 103. In the embodiment of FIG. 6, sixteen dPAPs 209 are compared. The dPAP 613 portion of the PAP 699 is physical address bits PA[16:12] used to select the set of the L2 cache 107 that contains the hit entry 401 combined with the L2way number 606 of the hit entry 401. The sixteen dPAPs 209 are the dPAPs 209 of the sixteen selected entries 201. If there is a dPAP match of one or more valid entries 201, the hit entries 201 are indicated on an L1 hit indicator 616, received by control logic 617, that specifies each way of each set having a hit entry 201. Because the L1 data cache 103 is a virtually-indexed virtually-tagged cache, it may be holding multiple copies of the cache line being snooped and may therefore detect multiple snoop hits. In one embodiment, the L1 hit indicator 616 comprises a 16-bit vector. The control logic 617 uses the L1 hit indicator 616 to reply to the L2 cache 107, e.g., to indicate a miss or to perform an invalidation of each hit entry 201, as well as a write back of any modified cache lines to memory.

In one embodiment, the multiple sets (e.g., four sets in the embodiment of FIG. 6) are selected in a time sequential fashion as are the tag comparisons performed by the comparators 614. For example, rather than having four set index inputs 612 as shown in FIG. 6, the L1 data cache 103 may have a single set index input 612, and each of the four L1 set index values corresponding to the four different possible values of the two VA[13:12] bits are used to access the L1 data cache 103 in a sequential fashion, e.g., over four different clock cycles, e.g., in a pipelined fashion. Such an embodiment may have the advantage of less complex hardware in exchange for potentially reduced performance.

The smaller PAP (i.e., smaller than the physical memory line address PA[51:6]), as well as even smaller dPAPs, may improve timing because the comparisons that need to be performed (e.g., by comparators 614) are considerably smaller than conventional comparisons. To illustrate, assume a conventional processor whose first-level data cache stores and compares physical address tags, e.g., approximately forty bits. In contrast, the comparisons of dPAPs may be much smaller, e.g., seven bits in the embodiment of FIG. 6. Thus, the comparisons made by the comparators 614 of the embodiment of FIG. 6 may be approximately an order of magnitude smaller and therefore much faster than a conventional processor, which may improve the cycle time for a processor that compares dPAPs rather than full physical addresses. Second, there may be a significant area savings due to less logic, e.g., smaller comparators, and less storage elements, e.g., seven bits to store a dPAP in an L1 cache entry 201 rather than a large physical address tag. Still further, the much smaller dPAP comparisons may be sufficiently faster and smaller to make feasible an embodiment in which the comparisons of the ways of multiple selected sets are performed in parallel (e.g., sixteen parallel comparisons in the embodiment of FIG. 6). Finally, the smaller PAPs may further improve timing and area savings in other portions of the core 100 in which PAPs may be used in place of physical memory line addresses for other purposes, such as in entries of the load/store queue 125 for making decisions whether to perform a speculative store-to-load forward operation and for performing store-to-load forwarding violation checking at load/store commit time, or in entries of the write combine buffer 109 to determine whether store data of multiple store operations may be combined in an entry of the write combine buffer 109.

FIG. 7 is an example flowchart illustrating operation of the cache subsystem 600 of FIG. 6 to process a miss in the L1 data cache 103 in furtherance of an inclusive cache policy in accordance with embodiments of the present disclosure. Operation begins at block 702.

At block 702, a virtual address (e.g., VA 321 of FIG. 2 of a load/store operation) misses in the L1 data cache 103. In response, the cache subsystem 600 generates a cache line fill request to the L2 cache 107. The fill request specifies a physical address that is a translation of the missing virtual address obtained from the DTLB 141 of FIG. 1, which obtains the physical address from the TWE 145 of FIG. 1 if the physical address is missing in the DTLB 141. Operation proceeds to block 704.

At block 704, the L2 cache 107 looks up the physical address to obtain the requested cache line that has been allocated into the L2 cache 107. (If the physical address is missing, the L2 cache 107 fetches the cache line at the physical address from memory (or from another cache memory higher in the cache hierarchy) and allocates the physical address into an entry 401 of the L2 cache 107.) The L2 cache 107 then returns a copy of the cache line to the L1 data cache 103 as well as the dPAP (e.g., dPAP 323 of FIG. 3) of the entry 401 of the L2 cache 107 into which the cache line is allocated. The L1 data cache 103 writes the returned cache line and dPAP into the respective cache line data 202 and dPAP 209 of FIG. 2 of the allocated entry 201. Operation proceeds to block 706.

At block 706, at some time later, when the L2 cache 107 subsequently evicts its copy of the cache line (e.g., in response to a snoop request or when the L2 cache 107 decides to replace the entry 401 and allocate it to a different physical address), the L2 cache 107 also causes the L1 data cache 103 to evict its copy of the cache line. Thus, in the manner of FIG. 7, the L2 cache 107 is inclusive of the L1 data cache 103. Stated alternatively, as long as the cache line remains in the L1 data cache 103, the L2 cache 107 also keeps its copy of the cache line.

FIG. 8 is an example flowchart illustrating operation of the cache subsystem 600 of FIG. 6 to process a snoop request in accordance with embodiments of the present disclosure. Operation begins at block 802.

At block 802, a physically-indexed physically-tagged set associative L2 cache (e.g., L2 cache 107 of FIG. 6) that is inclusive of a lower-level data cache (e.g., L1 data cache 103 of FIG. 6) receives a snoop request (e.g., snoop request 601) that specifies a physical memory line address. Operation proceeds to block 804.

At block 804, the L2 cache 107 determines whether the physical memory line address hits in any of its entries 401. If so, operation proceeds to block 806; otherwise, operation proceeds to block 805 at which the L2 cache 107 does not forward the snoop request to the L1 data cache 103.

At block 806, the snoop request is forwarded to the L1 data cache 103, e.g., as a forwarded snoop request (e.g., forwarded snoop request 611). The forwarded snoop request replaces the physical memory line address of the original snoop request (e.g., PA[51:6] of FIG. 6) with the PAP (e.g., PAP 699 of FIG. 6) of the entry 401 of the L2 cache 107 that was hit, i.e., the way number (e.g., L2way 606 of FIG. 6) and the set index (e.g., L2 set index 602 of FIG. 6) that together point to the hit entry 401 of the L2 cache 107. Operation proceeds to block 808.

At block 808, the L1 data cache 103 uses N bits of the PAP (e.g., N=6 untranslated address bits such as PA[11:6] of FIG. 6) as lower set index bits to select one or more (S) sets of the L1 data cache 103. As described above with respect to FIG. 6, for the upper bits of the set index (e.g., two upper bits in FIG. 6), the L1 data cache 103 generates all possible combinations of the upper bits. The upper bits correspond to translated virtual address bits that are used to allocate into the L1 data cache 103, e.g., during a load/store operation (e.g., VA [13:12] 321 of FIG. 3). The L1 data cache 103 also uses the remaining bits of the PAP (i.e., not used in the L1 set index), which is the dPAP 613 portion of the PAP 699 of FIG. 6, to compare against the dPAPs 209 stored in each valid entry 201 of the selected sets to determine whether any snoop hits occurred in the L1 data cache 103 in response to the forwarded snoop request (e.g., as indicated on L1 hit indicator 616 of FIG. 6). To process the forwarded snoop request, the L1 data cache 103 also performs an invalidation of each hit entry 201 as well as a write back of any modified cache lines to memory.

Figure 9:
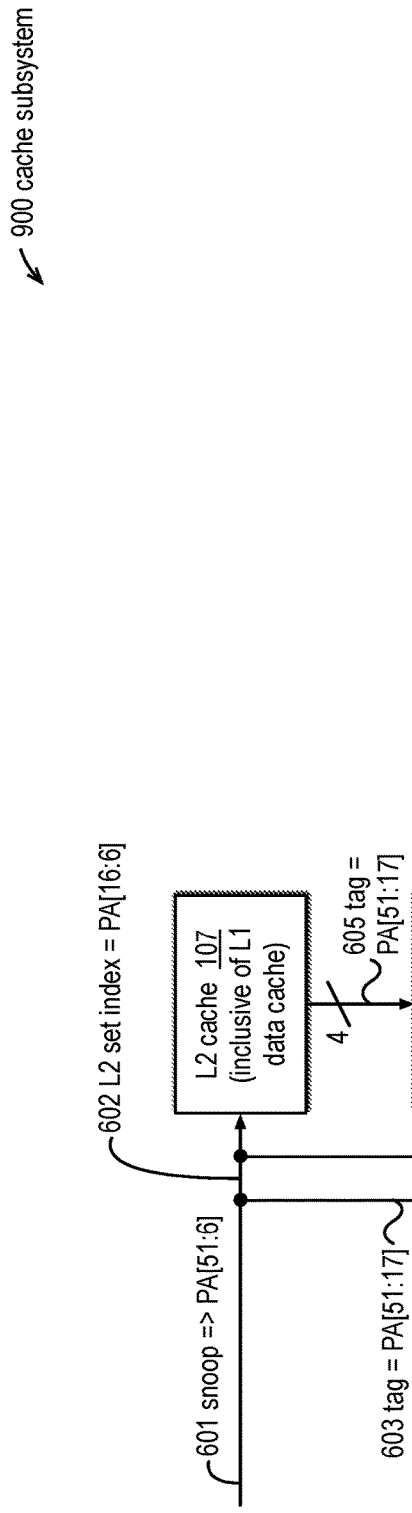
FIG. 9 is an example block diagram of a cache subsystem that employs PAPs to accomplish cache coherence in accordance with embodiments of the present disclosure.
Figure 10:
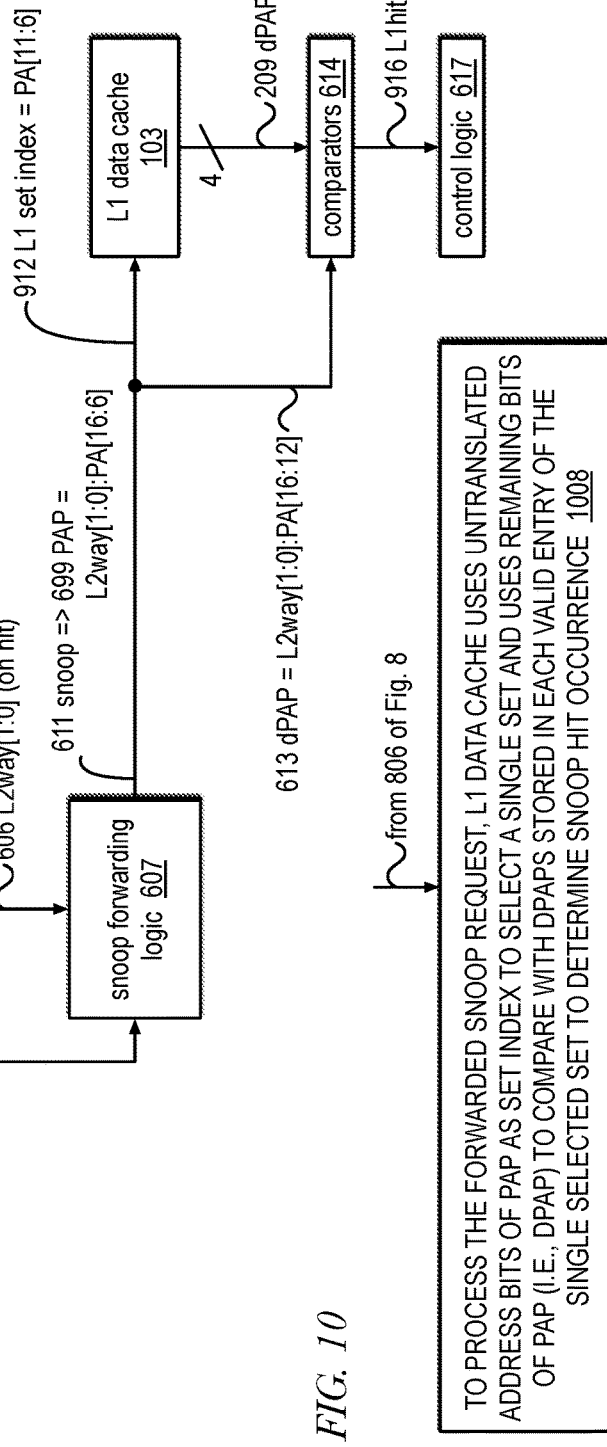
FIG. 10 is an example flowchart portion illustrating operation of the cache subsystem of FIG. 9 to process a snoop request in accordance with embodiments of the present disclosure.

FIG. 9 is an example block diagram of a cache subsystem 900 that employs PAPs to accomplish cache coherence in accordance with embodiments of the present disclosure. The cache subsystem 900 of FIG. 9 is similar in many respects to the cache subsystem 600 of FIG. 6. However, in the cache subsystem 900 of FIG. 9, to process the forwarded snoop request 611, a single set of the L1 data cache 103 is selected rather than multiple sets. More specifically, the L1 data cache 103 uses untranslated bits (e.g., PA[11:6]) of the PAP 699 of the forwarded snoop request 611 that correspond to all bits of the L1 set index 912 to select a single set; the dPAP 613 is then used by comparators 614 to compare with the dPAPs 209 stored in each of the four ways of the single selected set to determine whether any snoop hits occurred in entries 201 of the L1 data cache 103 in response to the forwarded snoop request as indicated on L1 hit indicator 916, as described in block 1008 of FIG. 10 in which operation flows to block 1008 from block 806 of FIG. 8 (rather than to block 808). In one embodiment, the L1 hit indicator 616 comprises a 4-bit vector. The embodiment of FIG. 9 may be employed when the L1 data cache 103 is sufficiently small and its cache lines size and set associative arrangement are such that the number of set index bits 912 are less than or equal to the number of untranslated address bits (excluding the cache line offset bits) such that corresponding bits of the L1 and L2 set indices correspond to untranslated address bits of the L1 data cache 103 virtual address 321 and the L2 cache 107 physical memory line address 521 such that a single set of the L1 data cache 103 may be selected to process a snoop request. For example, in the embodiment of FIG. 9, the L1 data cache 103 is a 16 KB cache memory having 4 ways that each store a 64-byte cache line; therefore, the L1 data cache 103 has 64 sets requiring a set index 912 of 6 bits that correspond to untranslated virtual address bits VA[11:6] that are mathematically equivalent to untranslated physical address bits PA[11:6] that correspond to the lower 6 bits of the L2 set index 602.

Figures 11, 12:
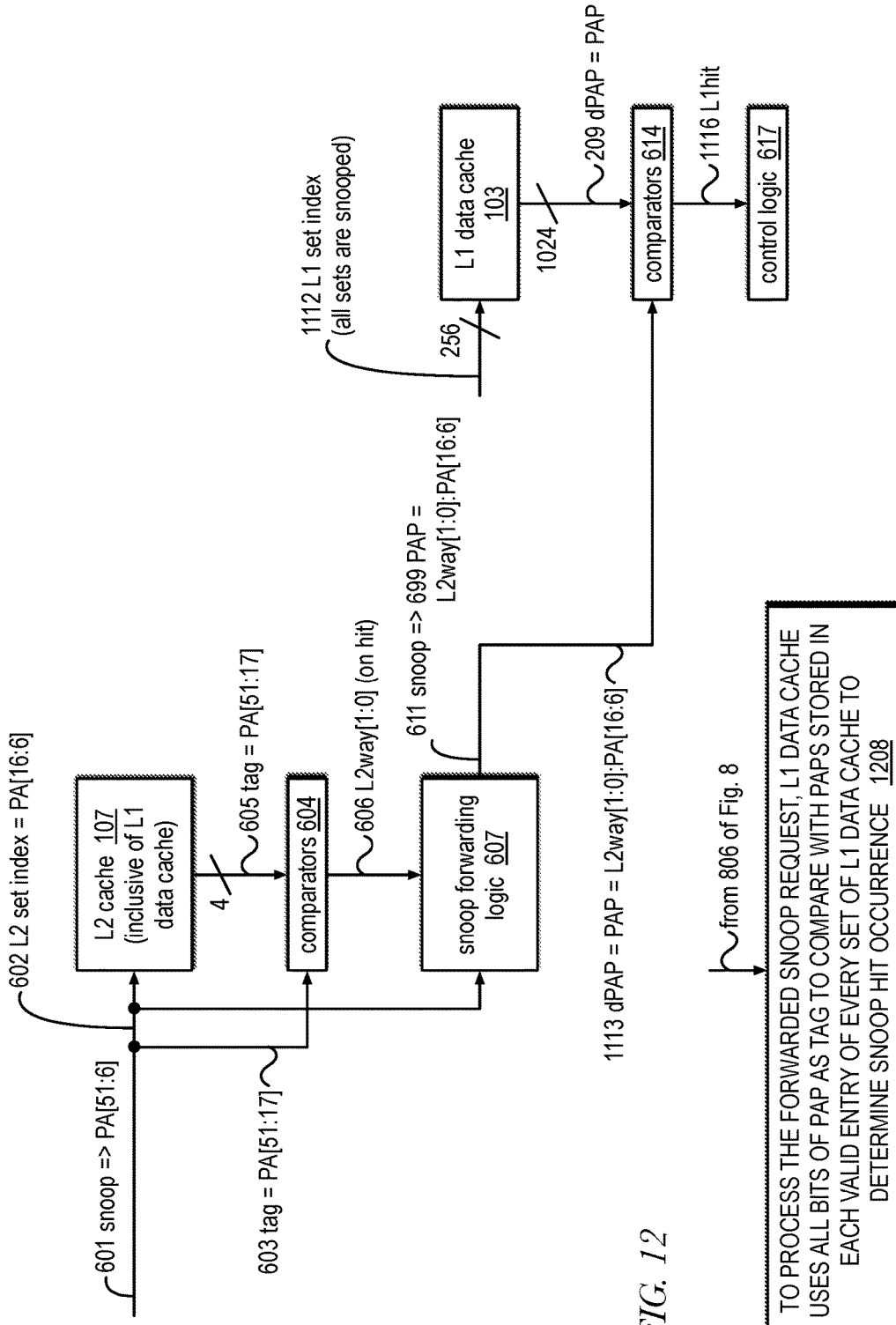
FIG. 11 is an example block diagram of a cache subsystem that employs PAPs to accomplish cache coherence in accordance with embodiments of the present disclosure.
FIG. 12 is an example flowchart portion illustrating operation of the cache subsystem of FIG. 11 to process a snoop request in accordance with embodiments of the present disclosure.

FIG. 11 is an example block diagram of a cache subsystem 1100 that employs PAPs to accomplish cache coherence in accordance with embodiments of the present disclosure. The cache subsystem 1100 of FIG. 11 is similar in many respects to the cache subsystem 600 of FIG. 6. However, in the cache subsystem 1100 of FIG. 11, all bits of the PAP 699 are used as the dPAP 1113 for processing snoop requests. More specifically, the dPAP 209 stored in an allocated entry of the L1 data cache 103 (e.g., at block 704 of FIG. 7) is the full PAP, no bits of the PAP 699 are used in the L1 set index 1112 to select sets to process a forwarded snoop request 611, and all bits of the PAP 699 provided by the forwarded snoop request 611, i.e., the dPAP 1113, are used by comparators 614 to compare with the dPAP 209 stored in the entries 201 of the L1 data cache 103. That is, in the embodiment of FIG. 11, the dPAP and the PAP are equivalent. Furthermore, in the embodiment of FIG. 11, all bits of the PAP stored in the dPAP field 209 of FIG. 2 of all sets of the L1 data cache 103 are compared by comparators 614 with the dPAP 1113, which is the PAP 699 of the forwarded snoop request 611, and the L1 hit indicator 1116 specifies the hit entries 201, as described in block 1208 of FIG. 12 in which operation flows to block 1208 from block 806 of FIG. 8 (rather than to block 808). In one embodiment, the L1 hit indicator 1116 comprises a 1024-bit vector.

The embodiment of FIG. 11 may be employed when the address bits that correspond to the set index 326 used to access the L1 data cache 103 during an allocation operation (e.g., load/store operation) are not mathematically equivalent to the address bits that correspond to the set index 526 used to access the L2 cache 107. For example, the address bits that correspond to the set index 326 used to access the L1 data cache 103 during an allocation operation may be virtual address bits and/or a hash of virtual address bits or other bits such as a translation context of the load/store operation.

The embodiments described herein may enjoy the following advantages. First, the use of PAPs may improve timing because the comparisons that need to be performed are considerably smaller than conventional comparisons. To illustrate, assume a conventional processor that compares physical memory line address tags, e.g., on the order of forty bits. In contrast, the comparisons of PAPs or diminutive PAPs may be much smaller, e.g., single-digit number of bits. Thus, the comparisons may be much smaller and therefore much faster, which may improve the cycle time for a processor that compares PAPs or diminutive PAPs rather than physical cache line address tags. Second, there may be a significant area savings due to less logic, e.g., smaller comparators, and less storage elements, e.g., fewer bits to store a PAP or diminutive PAP rather than a physical memory line address in a cache entry, load/store queue entry, write combine buffer, etc.

Store-to-Load Forwarding Using PAPs

Embodiments are now described in which PAPs are used to make determinations related to store-to-load forwarding. Store-to-load forwarding refers to an operation performed by processors to increase performance and generally may be described as follows. Typically, when a load instruction is executed, the load unit looks up the load address in the cache, and if a hit occurs the cache data is provided to the load instruction. However, there may be an outstanding store instruction that is older than the load instruction and that has not yet written the store data to the cache for the same memory address as the load address. In this situation, if the cache data is provided to the load instruction it would be stale data. That is, the load instruction would be receiving the wrong data. One solution to solving this problem is to wait to execute the load instruction until all older store instructions have written their data to the cache. However, a higher performance solution is to hold the store data of outstanding store instructions (i.e., that have not yet written their store data into the cache) in a separate structure, typically referred to as a store queue. During execution of the load instruction the store queue is checked to see if the load data requested by the load instruction is present in the store queue. If so, the store data in the store queue is "forwarded" to the load instruction rather than the stale cache data.

Load and store instructions specify virtual load and store addresses. If forwarding is performed without comparing physical load and store addresses, i.e., forwarding based solely on virtual address comparisons, the forwarded store data may not be the correct requested load data since two different virtual addresses may be aliases of the same physical address. However, there are reasons to avoid comparing physical addresses for store-to-load forwarding purposes. First, the physical addresses are large and would require a significant amount of additional storage space per entry of the store queue. Second, timing is critical in high performance processors, and the logic to compare a large physical address is relatively slow. Historically, high performance processors speculatively perform store-to-load forwarding based on virtual address comparisons and use much fewer than the entire virtual addresses for fast comparisons, e.g., using only untranslated address bits of the virtual addresses. These high performance processors then perform checks later, either late in the execution pipeline or when the load instruction is ready to retire, to determine whether the incorrect data was forwarded to it. Third, even if the store physical addresses were held in the store queue, the load physical address is typically not available early in the load unit pipeline for use in comparing with the store physical addresses in the store queue thus resulting in a longer execution time of the load instruction, more specifically resulting in a longer load-to-use latency of the processor, which is highly undesirable with respect to processor performance.

FIG. 13 is an example block diagram of a store queue (SQ) entry 1301 of the SQ 125 of FIG. 1 that holds PAPs to accomplish store-to-load forwarding in accordance with embodiments of the present disclosure. The SQ entry 1301 includes store data 1302, a store PAP 1304, lower physical address bits PA[5:3] 1306, a byte mask 1308, and a valid bit 1309. The valid bit 1309 is true if the SQ entry 1301 is valid, i.e., the SQ entry 1301 has been allocated to a store instruction and its fields are populated with valid information associated with the store instruction. The store data 1302 is the data that is specified by the store instruction to be stored to memory. The store data is obtained from the register file 105 specified by the store instruction. The population of the SQ entry 1301 is described in more detail below with respect to FIG. 15.

The store PAP 1304 is a physical address proxy for a store physical line address to which the store data 1302 is to be written. The store instruction specifies a store virtual address. The store physical line address is a translation of a portion of the store virtual address, namely upper address bits (e.g., bits 12 and above in the case of a 4 KB page size). As described above, when a cache line is brought into the L2 cache 107 from a physical line address, e.g., by a load or store instruction, the upper address bits of the load/store virtual address specified by the load/store instruction are translated into a load/store physical line address, e.g., by the MMU 147 of FIG. 1. The cache line is brought into, i.e., allocated into, an entry of the L2 cache 107, which has a unique set index and way number, as described above.

The store PAP 1304 specifies the set index and the way number of the entry in the L2 cache 107 into which the cache line was allocated, i.e., the cache line specified by the physical line address of the load/store instruction that brought the cache line into the L2 cache 107, which physical line address corresponds to the store physical line address that is a translation of the upper bits of the store virtual address. The lower bits of the store virtual address (e.g., bits [11:0] in the case of a 4 KB page size) are untranslated address bits, i.e., the untranslated bits of the virtual and physical addresses are identical, as described above. The store physical address bits PA[5:3] 1306 correspond to the untranslated address bits [5:3] of the store virtual address. The store instruction also specifies a size of the store data to be written. In the example embodiment, the largest size of store data (and load data) is eight bytes. Hence, in the embodiment of FIG. 13, the size of the store data 1302 is up to eight bytes, and the store physical address bits PA[5:3]

1306 narrows down the location of the store data 1302 within a 64-byte cache line, for example. The store size and bits [2:0] of the store address may be used to generate the store byte mask 1308 that specifies, or encodes, which of the eight bytes are being written by the store instruction. Other embodiments are contemplated in which the bytes written by the store instruction are specified in a different manner, e.g., the size itself and bits [2:0] of the store address may be held in the SQ entry 1301 rather than the byte mask 1308.

Advantageously, each entry of the SQ 125 holds the store PAP 1304 rather than the full store physical line address, as described in more detail below. In the embodiment of FIG. 13, because in the example embodiment the L2 cache 107 is 4-way set associative, the store PAP 1304 specifies the 2 bits of the way number of the entry in the L2 cache 107 into which the cache line specified by the physical line address is allocated. Furthermore, in the embodiment of FIG. 13, because in the example embodiment the L2 cache 107 has 2048 sets, the store PAP 1304 specifies the eleven bits of the set index of the set of the entry in the L2 cache 107 into which the cache line specified by the physical line address is allocated, which corresponds to physical line address bits PA[16:6] in the embodiment. Thus, in the embodiment of FIG. 13, the store PAP 1304 is thirteen bits, in contrast to a full store physical line address, which may be approximately forty-six bits in some implementations, as described above, and in other implementations there may be more. Advantageously, a significant savings may be enjoyed both in terms of storage space within the SQ 125 and in terms of timing by providing the ability to compare PAPs rather than full physical line addresses when making store-to-load forwarding determinations, as described in more detail below.

FIG. 14 is an example block diagram of portions of the processor 100 of FIG. 1 used to perform store-to-load forwarding using PAPs in accordance with embodiments of the present disclosure. In the embodiment of FIG. 14, shown are the SQ 125, portions of the L1 data cache 103 (hashed tag array 334, tag hash logic 312, and comparator 348 (and mux, not shown, that is controlled based on the result of the comparator 348), e.g., of FIG. 3), byte mask logic 1491, a mux 1446, and forwarding decision logic 1499. The byte mask logic 1491, mux 1446, and forwarding decision logic 1499 may be considered part of the LSU 117 of FIG. 1. FIG. 14 illustrates the processing of a load instruction to which store data may be forwarded from an entry of the SQ 125. The load instruction specifies a load virtual address VA[63:0] 321 (e.g., of FIG. 3) and a load size 1489. The byte mask logic 1491 uses the load VA 321 and load size 1489 to generate a load byte mask 1493 that specifies the eight or less bytes of load data to be read from within an eight-byte aligned memory address range. The load byte mask 1493 is provided to the forwarding decision logic 1499. The load virtual address bits VA[5:3], which are untranslated and identical to the load physical address bits PA[5:3], are also provided to the forwarding decision logic 1499. The load virtual address bits VA[11:6], which are untranslated and identical to the load physical address bits PA[11:6], are also provided to the forwarding decision logic 1499.

As described above, the set index 326 portion of the load VA 321 selects a set of the hashed tag array 334, each way of the selected set is provided to comparator 348, and the tag hash logic 312 uses the load VA 321 to generate a hashed tag 324 provided to comparator 348 for comparison with each of the selected hashed tags 208 (of FIG. 2). Assuming a valid match, the comparator 348 provides the dPAP 209 (of FIG. 2) of the valid matching entry 201 of the L1 data cache 103, as described above. The dPAP 209 in conjunction with the load PA[11:6] bits form a load PAP 1495. In the embodiment of FIG. 13, the load PAP 1495 specifies the set index and the way number of the entry in the L2 cache 107 into which the cache line was allocated, i.e., the cache line specified by the physical line address of the load/store instruction that brought the cache line into the L2 cache 107, which physical line address corresponds to the load physical line address that is a translation of the upper bits of the load VA 321. The load PAP 1495 is provided to the forwarding decision logic 1499. If there is no valid match, then there is no load PAP available for comparison with the store PAP 1304 and therefore no store-to-load forwarding may be performed, and there is no valid L1 data out 327; hence, a cache line fill request is generated, and the load instruction is replayed when the requested cache line and dPAP are returned by the L2 cache 107 and written into the L1 data cache 103.

The SQ 125 provides a selected SQ entry 1399. The selected SQ entry 1399 may be selected in different manners according to different embodiments, e.g., according to the embodiments of FIGS. 18 and 19. The store data 1302 of the selected SQ entry 1399 is provided to mux 1446, which also receives the output data of the hitting entry of the L1 data cache 103, i.e., L1 data out 327, e.g., of FIG. 3. In the case of a hit in the L1 data cache 103, a control signal forward 1497 generated by the forwarding decision logic 1499 controls mux 1446 to select either the store data 1302 from the selected SQ entry 1399 or the L1 data out 327. The store PAP 1304, store PA[5:3] bits 1306, store byte mask 1308 and store valid bit 1309 of the selected SQ entry 1399 are provided to the forwarding decision logic 1499.

The forwarding decision logic 1499 determines whether the store data 1302 of the selected SQ entry 1399 overlaps the load data requested by the load instruction. More specifically, the SQ entry selection and forwarding decision logic 1499 generates a true value on the forward signal 1497 to control the mux 1446 to select the store data 1302 if the store valid bit 1309 is true, the load PAP 1495 matches the store PAP 1304, the load PA[5:3] matches the store PA[5:3] 1306, and the load byte mask 1493 and the store byte mask 1308 indicate the store data overlaps the requested load data, i.e., the requested load data is included in the valid bytes of the store data 1302 of the selected SQ entry 1399; otherwise, the forwarding decision logic 1499 generates a false value on the forward signal 1497 to control the mux 1446 to select the L1 data out 327. Stated alternatively, the store data overlaps the requested load data and may be forwarded if the following conditions are met: (1) the selected SQ entry 1399 is valid; (2) the load physical address and the store physical address specify the same N-byte-aligned quantum of memory, where N is the width of the store data field 1302 in a SQ entry 1301 (e.g., N=8 bytes wide), e.g., the load PAP 1495 matches the store PAP 1304 and the load PA[5:3] matches the store PA[5:3] 1306; and (3) the valid bytes of the store data 1302 of the selected SQ entry 1399 as indicated by the store byte mask 1308 overlap the load data bytes requested by the load instruction as indicated by the load byte mask 1493. To illustrate by example, assuming a valid selected SQ entry 1399, a PAP match and a PA[5:3] match, assume the store byte mask 1308 is a binary value 00111100 and the load byte mask 1493 is a binary value 00110000; then the store data overlaps the requested load data and the store data will be forwarded. However, assume the load byte mask 1493 is a binary value 00000011; then the store data does not overlap the requested load data and the store data will be forwarded, and instead the L1 data out 327 will be selected. An example of logic that may perform the byte mask comparison is logic that performs a Boolean AND of the load and store byte masks and then indicates overlap if the Boolean result equals the load byte mask. Other embodiments are contemplated in which the entry 201 of the L1 data cache 103 also holds other information such as permissions associated with the specified memory location so that the forwarding decision logic 1499 may also determine whether it is permissible to forward the store data to the load instruction. Although an embodiment is described in which the width of the store queue data field 1302 equals the largest possible size specified by a store instruction, other embodiments are contemplated in which the width of the store queue data field 1302 is greater than the largest possible size specified by a store instruction.

Advantageously, the forwarding decision logic 1499 may compare load PAP 1495 against the store PAP 1304 since they are proxies for the respective load physical line address and store physical line address, which alleviates the need for the forwarding decision logic 1499 to compare the load physical line address and store physical line address themselves. Comparing the PAPs may result in a significantly faster determination (reflected in the value of the forward control signal 1497) of whether to forward the store data 1302 and may even improve the load-to-use latency of the processor 100. Additionally, each SQ entry 1301 holds the store PAP 1304 rather than the store physical line address, and each L1 data cache 103 entry 201 holds the load PAP 1495 (or at least a portion of it, i.e., the dPAP 209) rather than the load physical line address, which may result in a significant savings in terms of storage space in the processor 100. Finally, unlike conventional approaches that, for example, make forwarding decisions based merely on partial address comparisons (e.g., of untranslated address bits and/or virtual address bits), the embodiments described herein effectively make a full physical address comparison using the PAPs.

Further advantageously, the provision of the load PAP by the virtually-indexed virtually-tagged L1 data cache 103 may result in a faster determination of whether to forward the store data because the load PAP is available for comparison with the store PAP sooner than in a physically-accessed cache design in which the virtual load address is first looked up in a translation lookaside buffer. Still further, using the hashed tag array 334 to hold and provide the PAP for the load instruction may result in the load PAP being available for comparison with the store PAP sooner than if a full tag comparison is performed, again which may result in a faster determination of whether to forward the store data. Finally, a faster determination of whether to forward the store data may be obtained because the SQ 125 provides a single selected SQ entry 1399 which enables the load PAP to be compared against a single store PAP rather than having to perform a comparison of the load PAP with multiple store PAPs. These various speedups in the store forwarding determination may, either separately or in combination, improve the load-to-use latency of the processor 100, which is an important parameter for processor performance.

FIG. 15 is an example flowchart illustrating processing of a store instruction, e.g., by the processor 100 of FIG. 14, that includes writing a store PAP into a store queue entry in accordance with embodiments of the present disclosure. As described above, the L2 cache 107 is inclusive of the L1 data cache 103 such that when a cache line is brought into an entry of the L1 data cache 103, the cache line is also brought into an entry of the L2 cache 107 (unless the cache line already resides in the L2 cache 107). As described above, e.g., with respect to FIG. 7, when the cache line is brought into the entry 401 of the L2 cache 107, the dPAP 209 used to specify the allocated L2 entry 401 is written into the entry 201 allocated into the L1 data cache 103. As described above, the dPAP 209 is the PAP that specifies the L2 entry 401 less any bits of the L2 set index of the PAP used in the set index of the L1 data cache 103. Stated alternatively, the dPAP is the L2 way number of the L2 entry 401 along with any bits of the L2 set index of the entry 401 not used in the set index of the L1 data cache 103. Operation begins at block 1502.

At block 1502, the decode unit 112 of FIG. 1 encounters a store instruction and allocates a SQ entry 1301 for the store instruction and dispatches the store instruction to the instruction schedulers 121 of FIG. 1. The store instruction specifies a register of the register file 105 of FIG. 1 that holds the store data to be written to memory. The store instruction also specifies a store virtual address, e.g., store VA 321 of FIG. 3 (the store VA 321 may include all 64 bits, i.e., including bits [5:0], even though FIG. 3 only indicates bits [63:6]) and a size of the data, e.g., one, two, four, or eight bytes. Operation proceeds to block 1504.

At block 1504, the LSU 117 executes the store instruction. The store virtual address 321 hits in the L1 data cache 103, at least eventually. If the store virtual address 321 initially misses in the L1 data cache 103 (e.g., at block 702 of FIG. 7), a cache line fill request will be generated to the L2 cache 107, which involves the DTLB 141 translating the store virtual address 321 into a store physical address. A portion of the store physical address is the store physical line address, e.g., store PA[51:6] that is used in the lookup of the L2 cache 107 to obtain the requested cache line and, if missing in the L2 cache 107 (and missing in any other higher levels of the cache hierarchy, if present), used to access memory to obtain the cache line. The L2 cache 107 returns the cache line and the PAP that is a proxy for the store physical line address. More specifically, the PAP specifies the way number and set index that identifies the entry 401 of the L2 cache 107 that is inclusively holding the requested cache line. The dPAP portion of the PAP is written along with the cache line to the entry of the L1 data cache 103 allocated to the store instruction (e.g., at block 704 of FIG. 7). The store instruction is replayed when the requested cache line and dPAP are returned by the L2 cache 107 and written into the L1 data cache 103. Upon replay, the store virtual address 321 hits in the L1 data cache 103. The hitting entry 201 of the L1 data cache 103 provides the store dPAP 209 that is used along with untranslated bits of the store virtual address 321 (e.g., VA[11:6], which are identical to store physical address bits PA[11:6]) to form a store PAP that is a physical address proxy of the store physical line address, i.e., the store PAP points to the entry 401 of the L2 cache 107 that holds the copy of the cache line held in the entry 201 of the L1 data cache 103 hit by the store virtual address 321. The store physical line address is the upper bits (e.g., [51:6]) of the store physical address. Operation proceeds to block 1506.

At block 1506, the LSU 117 obtains the store data from the register file 105 and writes it into the store data field 1302 of the SQ entry 1301 allocated at block 1502. The LSU 117 also forms the store PAP using the store dPAP 209 obtained from the L1 data cache 103 at block 1504 and lower untranslated address bits of the store virtual address 321 (e.g., store VA[11:6]). The LSU 117 then writes the store PAP into the store PAP field 1304 of the allocated SQ entry 1301. Finally, the LSU 117 writes into the allocated SQ entry 1301 additional information that determines the store physical address and store data size, which in the embodiment of FIGS. 13 and 14 includes writing store address bits [5:3] into the PA[5:3] field 1306 and writing a store byte mask into the byte mask field 1308. The store byte mask indicates which bytes within an eight-byte-aligned quantum of memory the store data are to be written in an embodiment in which the store byte mask if eight bits. As described above, the SQ entry 1301 is configured to hold the store PAP 1304 rather than the full store physical line address, which advantageously may reduce the amount of storage needed in the SQ 125.

FIG. 16 is an example flowchart illustrating processing of a load instruction, e.g., by the processor 100 of FIG. 14, that includes using a load PAP and a store PAP from a store queue entry to decide whether to forward store data to the load instruction from the store queue entry in accordance with embodiments of the present disclosure. Operation begins at block 1602.

At block 1602, a load instruction is issued to the LSU (e.g., 117). The LSU looks up the load virtual address (e.g., 321) in the L1 data cache (e.g., 103). In the embodiment of FIG. 14 (and FIGS. 18 and 19), the lookup includes looking up the load virtual address in the hashed tag array (e.g., 334). In the embodiment of FIG. 20, the lookup includes looking up the load virtual address in the tag array. Similar to the manner described above with respect to block 1504, the load virtual address eventually hits in the L1 data cache. The hit entry (e.g., 201) provides the dPAP (e.g., 209) for the load instruction. The load dPAP along with untranslated bits of the load virtual address (e.g., VA[11:6], which are identical to the load physical address PA[11:6]) are used to form the load PAP (e.g., 1495), e.g., as shown in FIG. 14. Additionally, a load byte mask (e.g., 1493 of FIG. 14) is generated (e.g., by byte mask logic 1491 of FIG. 14) from the load data size (e.g., 1489 of FIG. 14) and the lowest address bits (e.g., VA[2:0], which are identical to the load physical address PA[2:0]), e.g., as shown in FIG. 14. Operation proceeds to block 1604.

At block 1604, the SQ 125 provides a selected SQ entry (e.g., 1399), which includes the store data (e.g., 1302), store PAP (e.g., 1304), store lower physical address bits (e.g., PA[5:3]), store byte mask (e.g., 1308), and store valid bit (e.g., 1309), e.g., as shown in FIG. 14. As described with respect to FIG. 14, the SQ entry may be selected in different manners according to different embodiments, e.g., according to the embodiments of FIGS. 18 and 19. Operation proceeds to block 1606.

At block 1606, the store PAP and load PAP are used (e.g., by forwarding logic 1499 of FIG. 14)—along with additional information, e.g., the store lower address bits 1306 and load lower address bits (e.g., PA[5:3]) and store byte mask 1308 and load byte mask 1493 of FIG. 14—to determine whether to forward the store data (e.g., 1302) from the selected SQ entry to the load instruction or whether instead the cache data (e.g., L1 data out 327) is provided to the load instruction. That is, the store PAP and load PAP and the additional information are used to determine whether the store data of the selected SQ entry overlaps the load data requested by the load instruction. If the store data of the selected SQ entry overlaps the requested load data, then the store data is forwarded; otherwise, the data out of the L1 data cache is provided for the load instruction. Embodiments described herein use the load and store PAPs as proxies for the load and store physical line addresses to determine that the load and store have the same physical line address, which is required for the store data to overlap the requested load data. In contrast, conventional designs may forego a full physical line address comparison because of timing delays (e.g., instead making forwarding decisions based merely on partial address comparisons, e.g., of untranslated address bits and/or virtual address bits), whereas the embodiments described herein effectively make a full physical address comparison using the PAPs, but at a smaller timing cost because of the smaller PAP comparisons.

Figure 17:
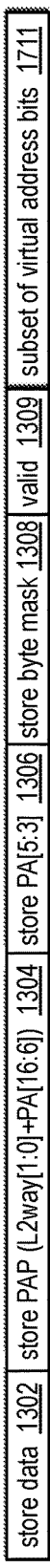
FIG. 17 is an example block diagram of a store queue entry of the store queue (SQ) of FIG. 1 that holds PAPs to accomplish store-to-load forwarding in accordance with embodiments of the present disclosure.
Figure 18:
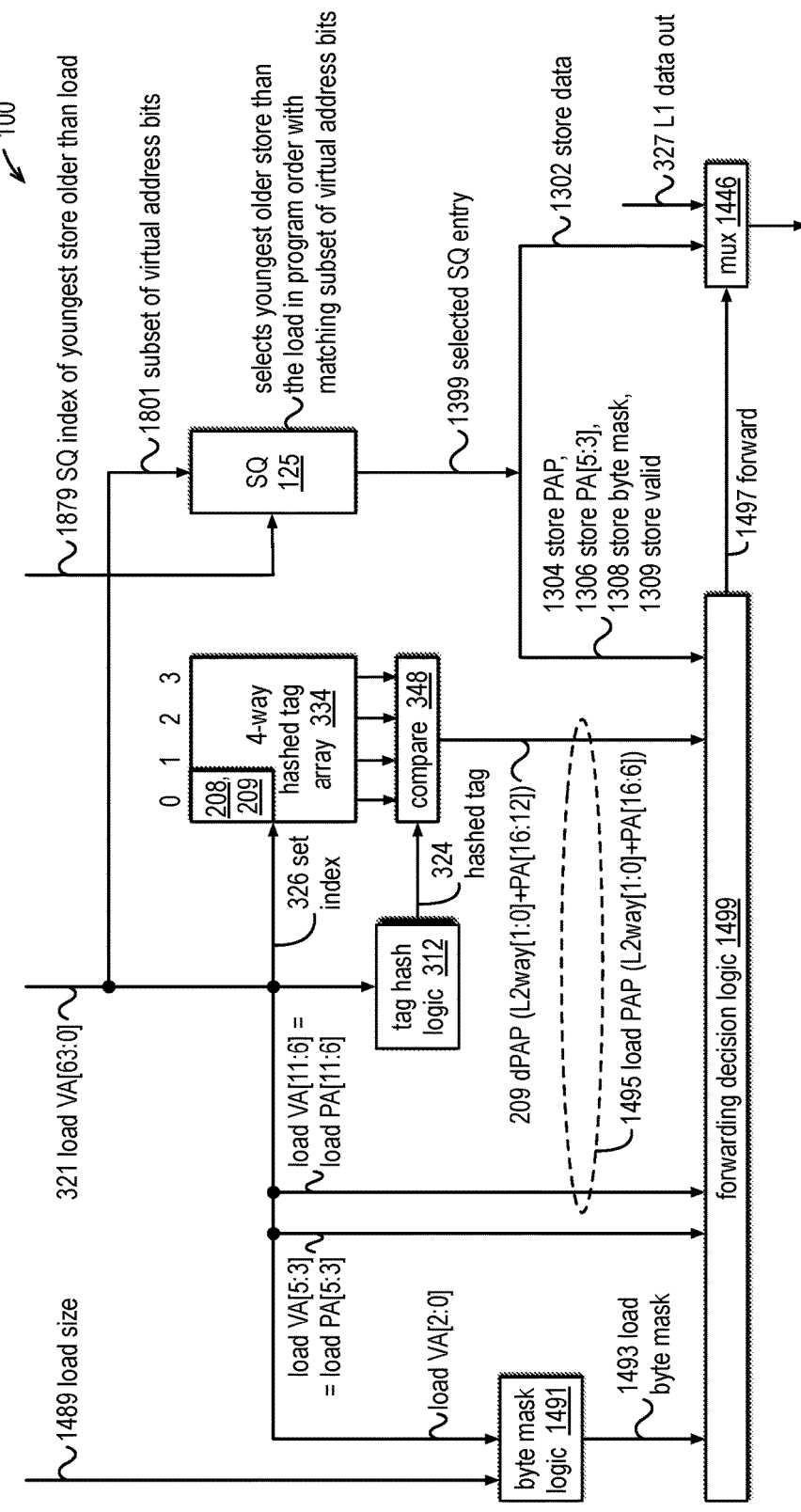
FIG. 18 is an example block diagram of portions of the processor of FIG. 1 used to perform store-to-load forwarding using PAPs in accordance with embodiments of the present disclosure.

FIG. 17 is an example block diagram of a SQ entry 1701 of the SQ 125 of FIG. 1 that holds PAPs to accomplish store-to-load forwarding in accordance with embodiments of the present disclosure. The SQ entry 1701 of FIG. 17 is similar in many respects to the SQ entry 1301 of FIG. 13. However, the SQ entry 1701 of FIG. 17 further includes a subset of virtual address bits 1711. In the embodiment of FIG. 18, the subset of virtual address bits 1711 is written, along with the other information of the SQ entry 1701 according to the operation of FIG. 15. That is, during execution of the store instruction the LSU 117 writes a corresponding subset of bits of the store virtual address 321 to the subset of virtual address bits field 1711 of the allocated SQ entry 1701, e.g., at block 1506, for subsequent use as described below with respect to FIG. 18.

FIG. 18 is an example block diagram of portions of the processor 100 of FIG. 1 used to perform store-to-load forwarding using PAPs in accordance with embodiments of the present disclosure. The embodiment of FIG. 18 is similar in many respects to the embodiment of FIG. 14, except that each entry 1701 of the SQ 125 also includes the subset of virtual address bits 1711 of FIG. 17. Additionally, in the embodiment of FIG. 18, the selected SQ entry 1399 (described with respect to FIG. 14) is selected using a subset of virtual address bits 1801 of the load virtual address 321, as shown. That is, the subset of the load virtual address bits 1801 are compared with the subset of virtual address bits 1711 of each valid entry of the SQ 125 for matches. If no matches are found, then no store-to-load forwarding is performed. The SQ 125 receives an indicator that indicates which entries 1701 of the SQ 125 are associated with store instructions that are older than the load instruction. Using the indicator, if one or more matches are found that are older in program order than the load instruction, logic within the SQ 125 selects as the selected SQ entry 1399 the youngest in program order from among the older matching SQ entries 1701. In one embodiment, the decode unit 112, which dispatches instructions—including all load and store instructions—to the execution units 114 in program order, generates and provides to the SQ 125, as the indicator, a SQ index 1879 for each load instruction which is the index into the SQ 125 of the SQ entry 1701 associated with the youngest store instruction that is older in program order than the load instruction. In an alternate embodiment, the index of the store instruction within the ROB 122 is held in each entry 1701 of the SQ 125, and the index of the load instruction within the ROB 122 (rather than the SQ index 1879) is provided to the SQ 125, as the indicator, for use, in conjunction with the ROB indices of the SQ entries 1701, in selecting the SQ entry 1701 associated with the matching youngest store instruction older in program order than the load instruction, i.e., selected SQ entry 1399. The SQ 125 provides the selected SQ entry 1399 to the forwarding decision logic 1499 and to the mux 1446, e.g., according to block 1604 of FIG. 16. That is, FIG. 18 describes an embodiment for selecting the selected SQ entry 1399, i.e., using virtual address bits and the indicator, and otherwise operation proceeds according to the manner described with respect to FIGS. 14 and 16, advantageously that the load and store PAPs, rather than full load and store physical line addresses, are used to determine whether the store data of the selected SQ entry 1399 overlaps the requested load data and may thus be forwarded. In an alternate embodiment, the load byte mask 1493 is provided to the SQ 125 (rather than to the forwarding decision logic 1499), and the logic within the SQ 125 compares the load byte mask 1493 against the store byte mask 1308 of each valid SQ entry 1701 to determine whether there is overlap of the requested load data by the store data 1302 of SQ entries 1701 whose subsets of virtual address bits 1711 match the load subset of virtual address bits 1801. That is, the logic within the SQ 125 additionally uses the byte mask compares to select the selected SQ entry 1399. In one embodiment, the subset of virtual address bits 1711 may be a hash of bits of the store virtual address 321 of the store instruction to which the SQ entry 1701 is allocated, and the subset of load virtual address bits 1801 used to compare with each valid entry 1701 of the SQ 125 may be a hash of bits of the load virtual address 321.

Figure 19:
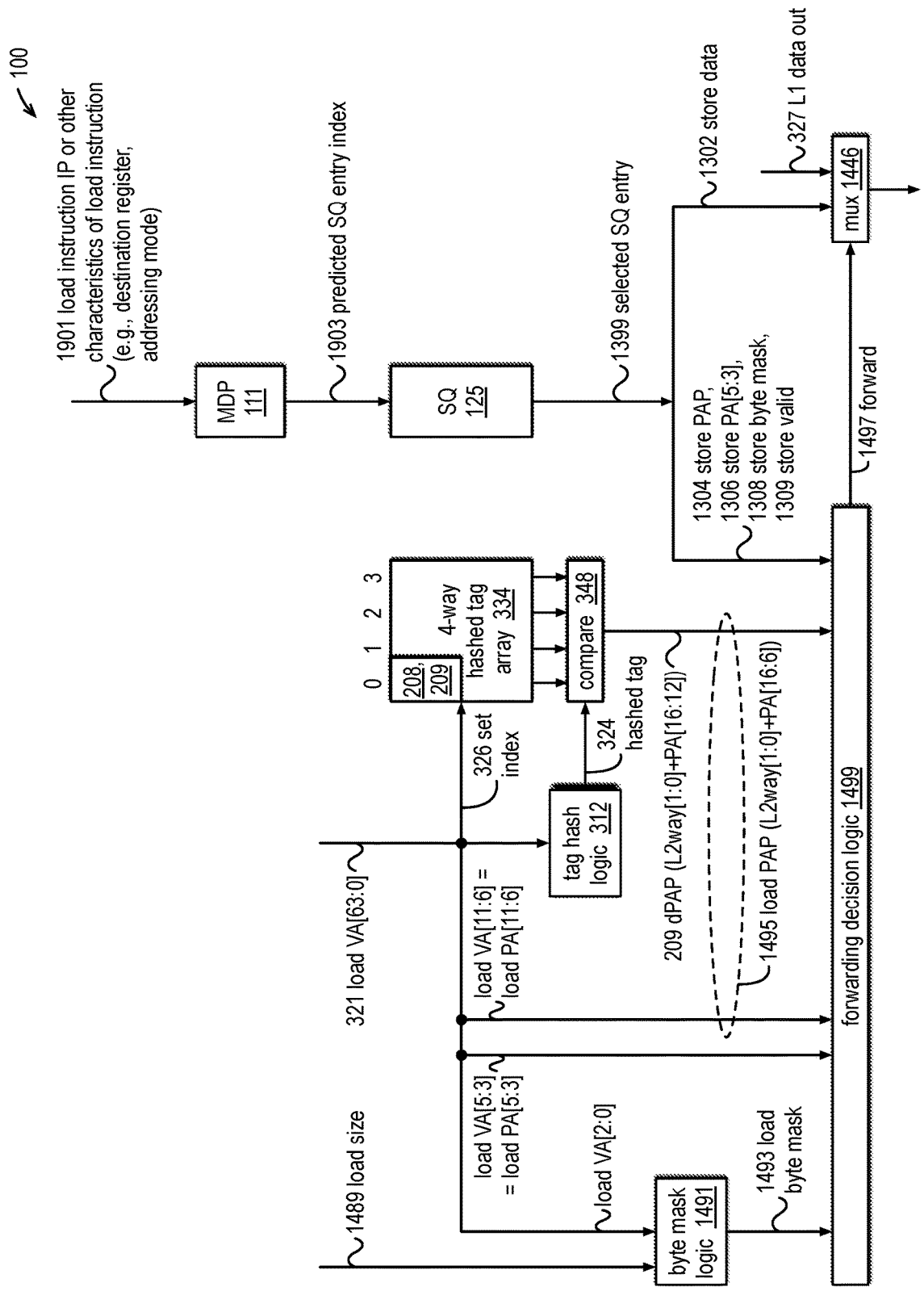
FIG. 19 is an example block diagram of portions of the processor of FIG. 1 used to perform store-to-load forwarding using PAPs in accordance with embodiments of the present disclosure.
Figure 20:
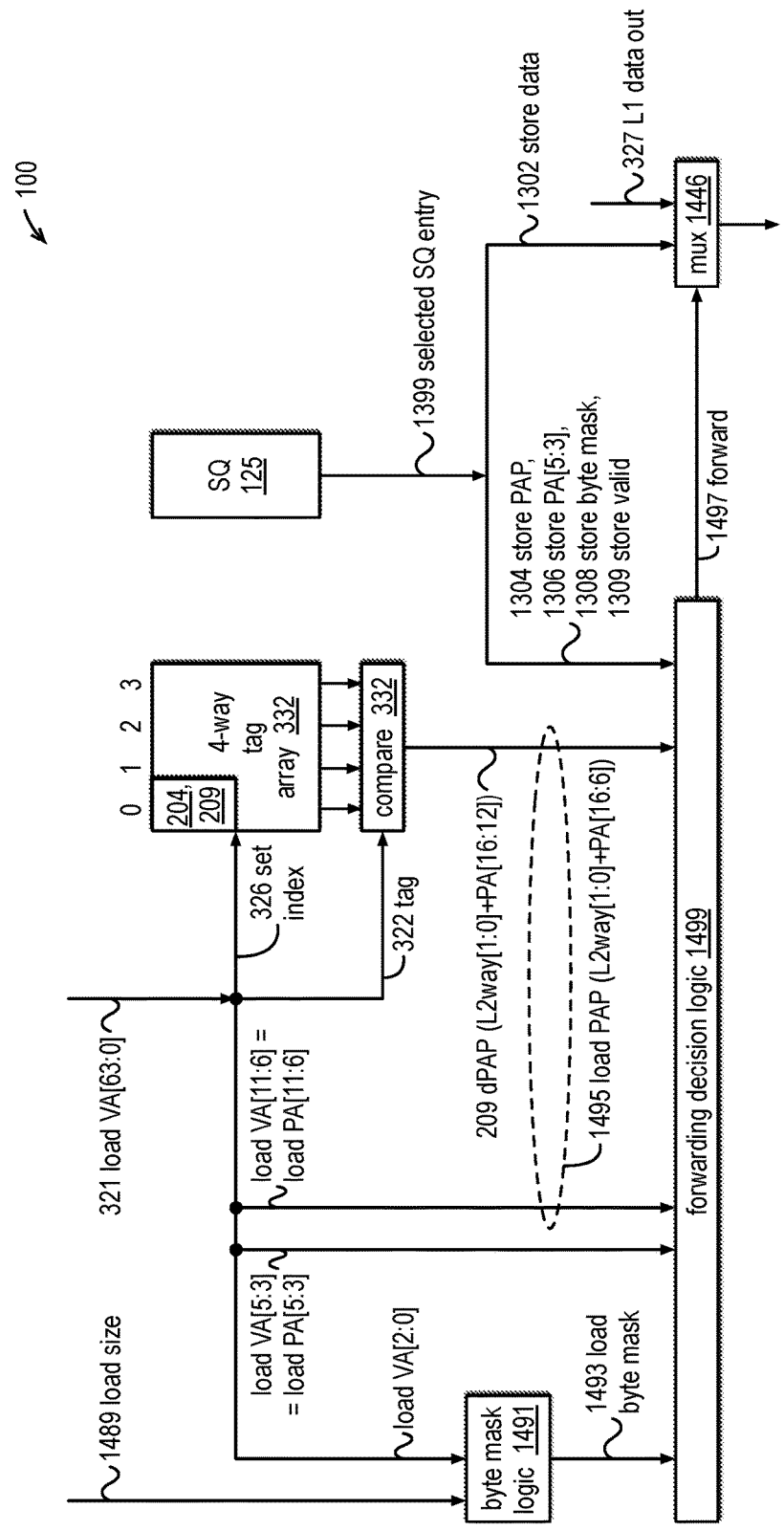
FIG. 20 is an example block diagram of portions of the processor of FIG. 1 used to perform store-to-load forwarding using PAPs in accordance with embodiments of the present disclosure.

FIG. 19 is an example block diagram of portions of the processor 100 of FIG. 1 used to perform store-to-load forwarding using PAPs in accordance with embodiments of the present disclosure. The embodiment of FIG. 19 is similar in many respects to the embodiment of FIG. 14, except that the embodiment of FIG. 19 uses the memory dependence predictor (MDP) 111 of FIG. 1 to provide a prediction of a store instruction from which to forward store data to the load instruction. In one embodiment, the MDP 111 receives an instruction pointer (IP) 1901 value of the load instruction, i.e., the address in memory from which the load instruction is fetched. In another embodiment, the MDP 111 receives information specifying other characteristics 1901 of the load instruction, such as a destination register of the store instruction or an addressing mode of the store instruction, i.e., a characteristic of the store instruction that may be used to distinguish the store instruction from other store instructions. The MDP 111 uses the received load instruction-specific information 1901 to generate a prediction of the store instruction from which store data should be forwarded to the load instruction. In the embodiment of FIG. 19, the prediction may be an index 1903 into the SQ 125 of the entry 1301 allocated to the predicted store instruction. The predicted SQ entry index 1903 is provided to the SQ 125 to select the selected SQ entry 1399. The SQ 125 provides the selected SQ entry 1399 to the forwarding decision logic 1499 and to the mux 1446, e.g., according to block 1604 of FIG. 16. That is, FIG. 19 describes an embodiment for selecting the selected SQ entry 1399, i.e., using the MDP 111, and otherwise operation proceeds according to the manner described with respect to FIGS. 14 and 16, advantageously that the load and store PAPs, rather than full load and store physical line addresses, are used to determine whether the store data of the selected SQ entry 1399 overlaps the requested load data and may thus be forwarded.

FIG. 20 is an example block diagram of portions of the processor 100 of FIG. 1 used to perform store-to-load forwarding using PAPs in accordance with embodiments of the present disclosure. The embodiment of FIG. 20 is similar in many respects to the embodiment of FIG. 14.

However, the embodiment is absent a hashed tag array 334. Instead, in the embodiment of FIG. 20, the tag array 332 holds the dPAPs 209, and the tag 322 of the load VA 321 is compared with each of the selected tags 204 (of FIG. 2) to determine which dPAP 209 to provide for formation into the load PAP 1495. Otherwise, operation proceeds according to the manner described with respect to FIGS. 14 and 16, advantageously that the load and store PAPs, rather than full load and store physical line addresses, are used to determine whether the store data of the selected SQ entry 1399 overlaps the requested load data and may thus be forwarded.

Figure 21:
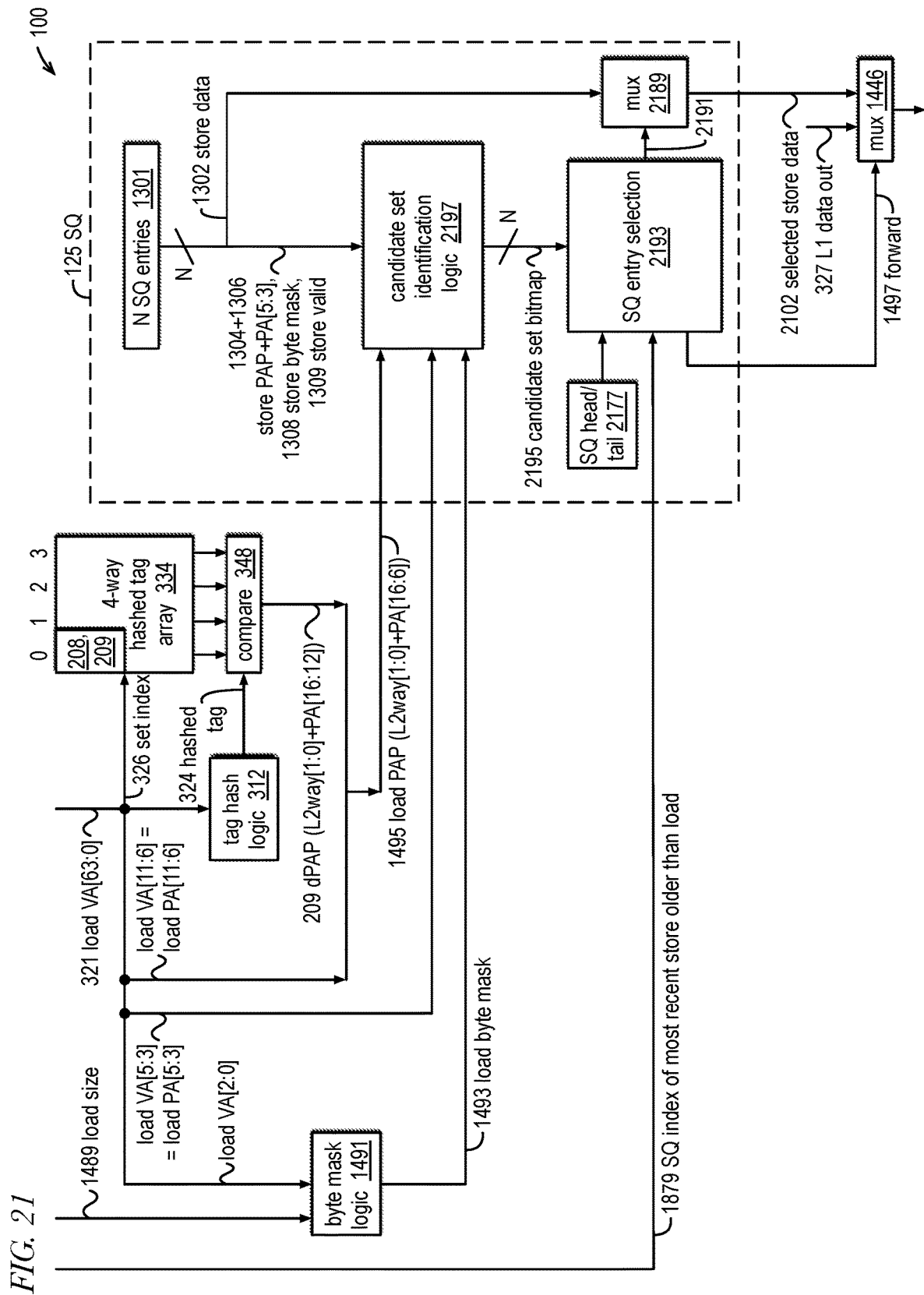
FIG. 21 is an example block diagram of portions of the processor of FIG. 1 used to perform store-to-load forwarding using PAPs in accordance with embodiments of the present disclosure.

FIG. 21 is an example block diagram of portions of the processor 100 of FIG. 1 used to perform store-to-load forwarding using PAPs in accordance with embodiments of the present disclosure. The embodiment of FIG. 21 is similar in many respects to the embodiment of FIG. 14, except that rather than using the load PAP to compare with a store PAP of a single selected SQ entry 1399 to determine whether the store data of the single selected SQ entry 1399 overlaps with the requested load data as in FIGS. 14 through 20, instead the load PAP is used to compare with the store PAP of all valid entries 1301 of the SQ 125 to select a SQ entry 1301 from which to forward store data to the load instruction.

The embodiment of FIG. 21 includes similar elements to FIG. 14 and additionally includes a SQ head/tail 2177 (i.e., the head and tail pointers that identify the set of valid SQ entries 1301), candidate set identification logic 2197, SQ entry selection logic 2193, and a mux 2189. The storage that stores all the SQ entries 1301 is also shown, the number of entries 1301 being denoted N in FIG. 21. The mux 2189 receives the stores data 1302 of all N of the SQ entries 1301 and selects the store data indicated by a control signal 2191 generated by the SQ entry selection logic 2193 as described in more detail below. The candidate set identification logic 2197 receives all N SQ entries 1301 of the SQ 125. The candidate set identification logic 2197 also receives the load PAP 1495, the load lower address bits PA[5:3], and the load byte mask 1493. The candidate set identification logic 2197 compares the load PAP 1495 and load lower address bits PA[5:3] and load byte mask 1493 with the respective store PAP 1304 and store lower address bits PA[5:3] 1306 and store byte mask 1308 of each of the N entries 1301 of the SQ 125 to generate a candidate set bit vector 2195. The candidate set bit vector 2195 includes a bit for each of the N SQ entries 1301. A bit of the bit vector 2195 associated with a SQ entry 1301 is true if its store PAP 1304 and store lower address bits PA[5:3] 1306 match the load PAP 1495 and load lower address bits PA[5:3] and the store byte mask 1308 overlaps the load byte mask 1493.

The SQ entry selection logic 2193 receives the candidate set bit vector 2195, head and tail pointers 2177 of the SQ 125, and the SQ index of the most recent store older than the load 1879. Using the head and tail pointers 2177 of the SQ 125 and the SQ index of the most recent store older than the load 1879, the SQ entry selection logic 2193 selects, and specifies on mux 2189 control signal 2191, the SQ entry 1301 associated with the youngest store instruction in program order from among the SQ entries 1301 whose associated bit of the candidate set bit vector 2195 is true that is older in program order than the load instruction, if such a SQ entry 1301 exists. If such a SQ entry 1301 exists, the SQ entry selection logic 2193 generates the forward control signal 1497 to select the selected store data 2102 out of the mux 1446; otherwise, the mux 1446 selects the L1 data out 327.

In an alternate embodiment, the index of the load instruction within the ROB 122 (rather than the SQ index 1879) is provided, similar to the description with respect to FIG. 18, for use by the SQ entry selection logic 2193 in generating the mux 2189 control signal 2191 to select the store data 1302 from the SQ entry 1301 associated with the youngest store instruction older in program order than the load instruction from among the SQ entries 1301 whose associated bit of the candidate set bit vector 2195 is true.

Figure 22:
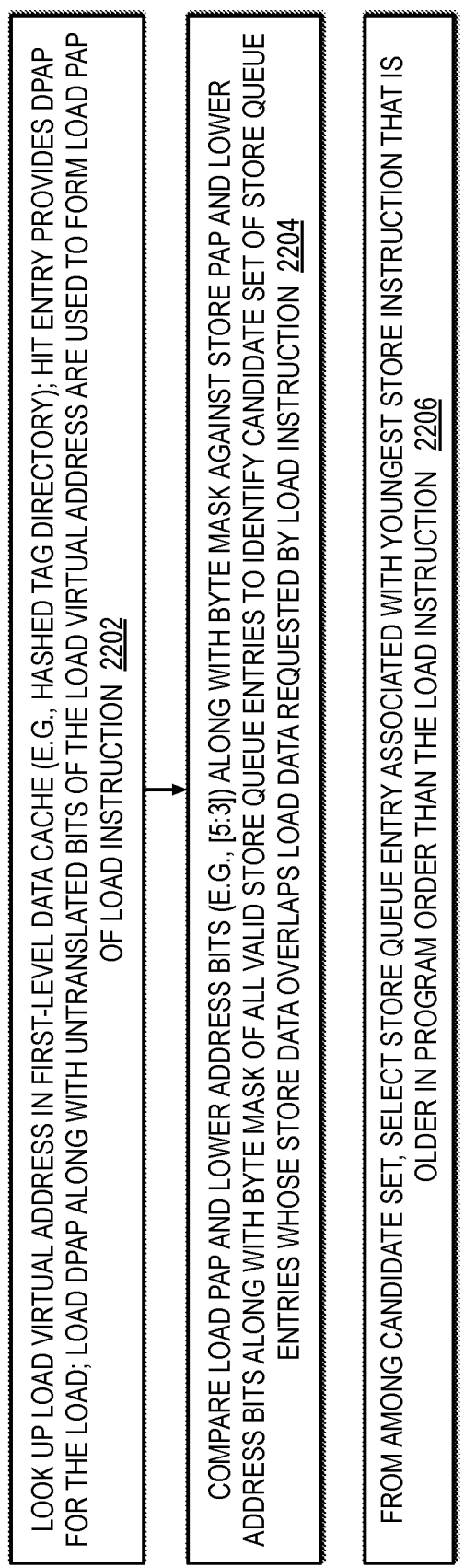
FIG. 22 is an example flowchart illustrating processing of a load instruction by the processor of FIG. 21 that includes using a load PAP and a store PAP of each entry of the store queue to decide whether to forward store data to the load instruction from a store queue entry in accordance with embodiments of the present disclosure.

FIG. 22 is an example flowchart illustrating processing of a load instruction by the processor 100 of FIG. 21 that includes using a load PAP and a store PAP of each entry of the store queue to decide whether to forward store data to the load instruction from a store queue entry in accordance with embodiments of the present disclosure. Operation begins at block 2202.

At block 2202, operation is similar to the operation described at block 1602 of FIG. 16. Operation proceeds to block 2204.

At block 2204, the load PAP (e.g., 1495) and load lower address bits (e.g., PA[5:3]) along with the load byte mask (e.g., 1493) are compared (e.g., by candidate set identification logic 2197 of FIG. 21) with the store PAP (e.g., 1304) and store lower physical address bits (e.g., PA[5:3]) along with the store byte mask (e.g., 1308) of each valid SQ entry (e.g., 1301) to identify a candidate set of SQ entries whose store data (e.g., 1302) overlaps the load data requested by the load instruction (e.g., indicated by candidate set bit vector 2195). Operation proceeds to block 2206.

At block 2206, from among the set of candidate SQ entries is selected (e.g., by mux 2189 controlled by SQ entry selection logic 2193) the store data from the SQ entry associated with youngest store instruction that is older in program order than the load instruction. Assuming such a SQ entry is found, the selected store data is forwarded to the load instruction; otherwise, the cache data (e.g., L1 data out 327) is provided to the load instruction. That is, the store PAP and load PAP and additional information (e.g., load and store lower address bits [5:3] and byte masks) are used to determine whether the store data of any of the SQ entries overlaps the load data requested by the load instruction. If the store data of the store instruction associated with one or more SQ entries overlaps the requested load data, and at least one of the overlapping store instructions is older than the load instruction, then the store data from the youngest of the older store instructions is forwarded; otherwise, the data out of the L1 data cache is provided for the load instruction. Embodiments described herein use the load and store PAPs as proxies for the load and store physical line addresses to determine that the load and candidate stores have the same physical line address, which is required for the store data to overlap the requested load data. In contrast, conventional designs may forego a full physical line address comparison because of timing delays (e.g., instead making forwarding decisions based merely on partial address comparisons, e.g., of untranslated address bits and/or virtual address bits), whereas the embodiments described herein effectively make a full physical address comparison using the PAPs, but at a smaller timing cost because of the smaller PAP comparisons.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, unless otherwise indicated, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure refers to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments, likewise, with the benefit of this disclosure, will be apparent to those having ordinary skill in the art, and such embodiments should be deemed as being encompassed herein. All examples and conditional language recited herein are intended for pedagogical objects to aid the reader in understanding the disclosure and the concepts contributed by the inventor to furthering the art and are construed as being without limitation to such specifically recited examples and conditions.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Finally, software can cause or configure the function, fabrication and/or description of the apparatus and methods described herein. This can be accomplished using general programming languages (e.g., C, C++), hardware description languages (HDL) including Verilog HDL, VHDL, and so on, or other available programs. Such software can be disposed in any known non-transitory computer-readable medium, such as magnetic tape, semiconductor, magnetic disk, or optical disc (e.g., CD-ROM, DVD-ROM, etc.), a network, wire line or another communications medium, having instructions stored thereon that are capable of causing or configuring the apparatus and methods described herein.

The invention claimed is:

1. A microprocessor, comprising:
   a physically-indexed physically-tagged second-level set-associative cache, wherein each entry in the second-level cache is uniquely identified by a set index and a way number of the second-level cache;
   a store queue of entries, wherein each entry in the store queue holds information for a store instruction comprising:
      store data to be written to a store physical address, wherein a portion of the store physical address is a store physical line address; and
      a store physical address proxy (PAP) for the store physical line address, wherein the store PAP specifies the set index and the way number of the entry in the second-level cache into which a cache line specified by the store physical line address is allocated; and
   a load unit configured to, during execution of a load instruction, use the store PAP held in an entry of the store queue in making a decision whether to forward to the load instruction the store data held in the entry of the store queue.

2. The microprocessor of claim 1, wherein the store PAP is half as many bits or less as the store physical line address.

3. The microprocessor of claim 1, wherein each entry of the store queue holds the store PAP rather than the store physical line address.

4. The microprocessor of claim 1,
wherein, during execution of a store instruction, the store queue is configured to populate an entry of the store queue with the store PAP for the store physical line address to which the store data of the store instruction is to be written.

5. The microprocessor of claim 1, further comprising:
a virtually-indexed virtually-tagged first-level data cache;
wherein the microprocessor has an inclusive allocation policy such that:
  each cache line allocated into the first-level data cache is also allocated into the second-level cache; and
  when the second-level cache evicts the cache line, the second-level cache also causes the first-level data cache to evict the cache line; and
wherein each valid entry in the first-level data cache holds:
  a diminutive PAP that is at least a portion of a PAP for a physical memory line address of a cache line allocated in the valid entry, wherein the PAP for the physical memory line address specifies the set index and the way number of the entry in the second-level cache into which the physical memory line address of the cache line allocated in the valid entry is allocated in accordance with the inclusive allocation policy; and
  wherein the at least a portion of the PAP for the physical memory line address comprises at least the way number of the entry in the second-level cache.

6. The microprocessor of claim 5,
wherein the load instruction specifies a virtual address;
wherein during execution of the load instruction:
  the first-level data cache is configured to provide the diminutive PAP of an entry upon which the virtual address hits; and
  the load unit is configured to:
    use the diminutive PAP to form a load PAP for the load instruction; and
    use a comparison of the load PAP with the store PAP in making the decision whether to forward to the load instruction the store data held in the entry of the store queue.

7. The microprocessor of claim 6,
wherein the first-level data cache comprises a directory that holds the diminutive PAP of each entry of the first-level data cache along with a hashed address tag;
wherein the directory is configured to, during execution of the load instruction, provide the diminutive PAP of a valid entry of the directory whose hashed address tag matches hashed bits of the virtual address; and
wherein the directory is configured to provide the diminutive PAP of the matching valid entry for use in forming the load PAP for the comparison with the store PAP.

8. The microprocessor of claim 7,
wherein the directory is configured to provide the diminutive PAP of the matching valid entry at least one clock cycle earlier than the first-level data cache provides a correct indication of whether the virtual address hits in the first-level data cache.

9. The microprocessor of claim 7,
wherein the first-level data cache is organized as a set-associative cache having multiple ways;
wherein the first-level data cache comprises a tag array, wherein each entry of the tag array holds a virtual address tag of the cache line allocated into the entry of the tag array,
wherein the first-level data cache is configured to use the virtual address tags of the tag array to make a correct determination of which way of the multiple ways the virtual address hits in; and
wherein the directory is configured to make a prediction of which way of the multiple ways the virtual address hits in to provide the diminutive PAP of the matching valid entry, wherein the directory is configured to make the way prediction using the hashed address tags without reference to the correct way determination based on the virtual address tags of the tag array.

10. The microprocessor of claim 5,
wherein the diminutive PAP includes the way number but excludes any bits of the set index of the entry in the second-level cache that correspond to untranslated bits of the virtual address used to index into the first-level data cache during execution of the load instruction.

11. The microprocessor of claim 1,
wherein the load instruction specifies a virtual address having one or more untranslated address bits;
wherein each entry of the store queue holds one or more untranslated address bits of the store physical address corresponding to the one or more untranslated address bits of the load virtual address; and
wherein the load unit identifies, based on a comparison of the one or more untranslated address bits of the load virtual address with the corresponding one or more untranslated address bits of the store physical address of each valid entry of the store queue, a candidate set of entries of the store queue for which the load unit decides whether to forward to the load instruction the store data held in an entry of the candidate set of entries.

12. The microprocessor of claim 11,
wherein the load unit selects the youngest store instruction older than the load instruction in program order among the entries of the candidate set as the entry of the store queue for which the load unit decides whether to forward to the load instruction the store data held in the entry of the store queue.

13. The microprocessor of claim 1, further comprising:
a predictor that, in response to one or more characteristics of the load instruction, makes a prediction of the entry of the store queue for which the load unit decides whether to forward to the load instruction the store data held in the entry of the store queue.

14. The microprocessor of claim 13,
wherein the one or more characteristics of the load instruction includes an instruction pointer address that specifies a location of the load instruction in memory.

15. The microprocessor of claim 13,
wherein the one or more characteristics of the load instruction includes a destination register or an addressing mode specified by the load instruction.

16. A method for use in a microprocessor, the method comprising:
wherein the microprocessor includes:
  a physically-indexed physically-tagged second-level set-associative cache, wherein each entry in the second-level cache is uniquely identified by a set index and a way number of the second-level cache;
  a store queue of entries; and
  a load unit;
holding, in each entry of the store queue of entries, information for a store instruction comprising:

store data to be written to a store physical address, wherein a portion of the store physical address is a store physical line address; and a store physical address proxy (PAP) for the store physical line address, wherein the store PAP specifies the set index and the way number of the entry in the second-level cache into which a cache line specified by the store physical line address is allocated; and using, by the load unit during execution of a load instruction, the store PAP held in an entry of the store queue in making a decision whether to forward to the load instruction the store data held in the entry of the store queue.

17. The method of claim 16, wherein the store PAP is half as many bits or less as the store physical line address.

18. The method of claim 16, wherein each entry of the store queue holds the store PAP rather than the store physical line address.

19. The method of claim 16,
populating, by the store queue during execution of a store instruction, an entry of the store queue with the store PAP for the store physical line address to which the store data of the store instruction is to be written.

20. The method of claim 16, further comprising:
wherein the microprocessor further includes a virtually-indexed virtually-tagged first-level data cache;
performing, by the microprocessor, an inclusive allocation policy such that:
each cache line allocated into the first-level data cache is also allocated into the second-level cache; and
when the second-level cache evicts the cache line, the second-level cache also causes the first-level data cache to evict the cache line; and
holing, by each valid entry in the first-level data cache:
a diminutive PAP that is at least a portion of a PAP for a physical memory line address of a cache line allocated in the valid entry, wherein the PAP for the physical memory line address specifies the set index and the way number of the entry in the second-level cache into which the physical memory line address of the cache line allocated in the valid entry is allocated in accordance with the inclusive allocation policy; and
wherein the at least a portion of the PAP for the physical memory line address comprises at least the way number of the entry in the second-level cache.

21. The method of claim 20,
wherein the load instruction specifies a virtual address;
during execution of the load instruction:
providing, by the first-level data, the diminutive PAP of an entry upon which the virtual address hits; and
by the load unit:
using the diminutive PAP to form a load PAP for the load instruction; and
using a comparison of the load PAP with the store PAP in making the decision whether to forward to the load instruction the store data held in the entry of the store queue.

22. The method of claim 21,
wherein the first-level data cache comprises a directory that holds the diminutive PAP of each entry of the first-level data cache along with a hashed address tag; and
wherein the directory is configured to, during execution of the load instruction, provide the diminutive PAP of a valid entry of the directory whose hashed address tag matches hashed bits of the virtual address for use in forming the load PAP for the comparison with the store PAP.

23. The method of claim 22,
providing, by the directory, the diminutive PAP of the matching valid entry at least one clock cycle earlier than the first-level data cache provides a correct indication of whether the virtual address hits in the first-level data cache.

24. The method of claim 22,
wherein the first-level data cache is organized as a set-associative cache having multiple ways;
wherein the first-level data cache comprises a tag array, wherein each entry of the tag array holds a virtual address tag of the cache line allocated into the entry of the tag array;
using, by the first-level data cache, the virtual address tags of the tag array to make a correct determination of which way of the multiple ways the virtual address hits in; and
making, by the directory, a prediction of which way of the multiple ways the virtual address hits in to provide the diminutive PAP of the matching valid entry, wherein the directory is configured to make the way prediction using the hashed address tags without reference to the correct way determination based on the virtual address tags of the tag array.

25. The method of claim 20,
wherein the diminutive PAP includes the way number but excludes any bits of the set index of the entry in the second-level cache that correspond to untranslated bits of the virtual address used to index into the first-level data cache during execution of the load instruction.

26. The method of claim 16,
wherein the load instruction specifies a virtual address having one or more untranslated address bits;
holding, by each entry of the store queue, one or more untranslated address bits of the store physical address corresponding to the one or more untranslated address bits of the load virtual address; and
identifying, by the load unit based on a comparison of the one or more untranslated address bits of the load virtual address with the corresponding one or more untranslated address bits of the store physical address of each valid entry of the store queue, a candidate set of entries of the store queue for which the load unit decides whether to forward to the load instruction the store data held in an entry of the candidate set of entries.

27. The method of claim 26,
selecting, by the load unit, the youngest store instruction older than the load instruction in program order among the entries of the candidate set as the entry of the store queue for which the load unit decides whether to forward to the load instruction the store data held in the entry of the store queue.

28. The method of claim 16, further comprising:
making, by a predictor in response to one or more characteristics of the load instruction, a prediction of the entry of the store queue for which the load unit decides whether to forward to the load instruction the store data held in the entry of the store queue.

29. The method of claim 28,
wherein the one or more characteristics of the load instruction includes an instruction pointer address that specifies a location of the load instruction in memory.

30. The method of claim 28,
wherein the one or more characteristics of the load instruction includes a destination register or an addressing mode specified by the load instruction.

31. A non-transitory computer-readable medium having instructions stored thereon that are capable of causing or configuring a microprocessor comprising:
- a physically-indexed physically-tagged second-level set-associative cache, wherein each entry in the second-level cache is uniquely identified by a set index and a way number of the second-level cache;
- a store queue of entries, wherein each entry in the store queue holds information for a store instruction comprising:
  - store data to be written to a store physical address, wherein a portion of the store physical address is a store physical line address; and
  - a store physical address proxy (PAP) for the store physical line address, wherein the store PAP specifies the set index and the way number of the entry in the second-level cache into which a cache line specified by the store physical line address is allocated; and
- a load unit configured to, during execution of a load instruction, use the store PAP held in an entry of the store queue in making a decision whether to forward to the load instruction the store data held in the entry of the store queue.

* * * * *

UNITED STATES PATENT AND TRADEMARK OFFICE
CERTIFICATE OF CORRECTION

| | | |
|---|---|---|
| PATENT NO. | : 11,416,406 B1 | Page 1 of 1 |
| APPLICATION NO. | : 17/351927 | |
| DATED | : August 16, 2022 | |
| INVENTOR(S) | : Favor et al. | |

It is certified that error appears in the above-identified patent and that said Letters Patent is hereby corrected as shown below:

On the Title Page

In Item (63), under "Related U.S. Application Data", in Column 1, Line 2, delete "2021." and insert -- 2021, now Pat. No. 11,416,400. --, therefor.

In the Specification

In Column 1, Lines 9-10, delete "May 7, 2021," and insert -- May 7, 2021, now U.S. Pat. No. 11,416,400, --, therefor.

In Column 6, Line 52, delete "microprocessor 110" and insert -- microprocessor 100 --, therefor.

In Column 7, Line 8, delete "(VIVID)." and insert -- (VMID). --, therefor.

In Column 11, Line 9, delete "way select 342" and insert -- way select 341 --, therefor.

In Column 12, Line 44, delete "dPAP field 202" and insert -- dPAP field 209 --, therefor.

In Column 25, Line 5, delete "if eight" and insert -- is eight --, therefor.

In Column 25, Line 47, delete "forwarding logic 1499" and insert -- forwarding decision logic 1499 --, therefor.

In Column 27, Line 57, delete "absent a" and insert -- absent in a --, therefor.

In the Claims

In Column 33, Line 35, in Claim 20, delete "holing," and insert -- holding, --, therefor.

Signed and Sealed this
Fourth Day of October, 2022

*Katherine Kelly Vidal*

Katherine Kelly Vidal
*Director of the United States Patent and Trademark Office*